United States Patent
Kurauchi et al.

(10) Patent No.: US 7,689,255 B2
(45) Date of Patent: Mar. 30, 2010

(54) IN-VEHICLE APPARATUS

(75) Inventors: Seiji Kurauchi, Kanagawa (JP);
Toshiaki Kobayashi, Saitama (JP);
Yuichiro Nishioka, Tokyo (JP);
Hiroyuki Arai, Tokyo (JP); Hisahiro Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 11/706,961

(22) Filed: Feb. 16, 2007

(65) Prior Publication Data
US 2007/0207840 A1 Sep. 6, 2007

(30) Foreign Application Priority Data
Feb. 17, 2006 (JP) ............................ P2006-040495

(51) Int. Cl.
*H04M 1/00* (2006.01)
(52) U.S. Cl. .................................................. 455/569.2
(58) Field of Classification Search ............... 455/569.2
See application file for complete search history.

(56) References Cited

U.S. PATENT DOCUMENTS

| | | | |
|---|---|---|---|
| 6,906,632 B2 * | 6/2005 | DeLine et al. | 340/815.4 |
| 6,993,367 B2 * | 1/2006 | Yamato et al. | 455/569.2 |
| 2003/0109290 A1 * | 6/2003 | Moffi et al. | 455/569 |
| 2005/0096099 A1 * | 5/2005 | Barclay et al. | 455/569.2 |
| 2006/0172780 A1 * | 8/2006 | Krippgans | 455/569.2 |
| 2007/0037607 A1 * | 2/2007 | Matsuda | 455/569.2 |
| 2008/0103655 A1 * | 5/2008 | Turnbull et al. | 701/33 |

FOREIGN PATENT DOCUMENTS

| | | |
|---|---|---|
| JP | 7-202997 | 8/1995 |
| JP | 9-83623 | 3/1997 |
| JP | 9-233164 | 9/1997 |
| JP | 2001-103547 | 4/2001 |

\* cited by examiner

*Primary Examiner*—Nick Corsaro
*Assistant Examiner*—Sowmini Nair
(74) *Attorney, Agent, or Firm*—Finnegan, Henderson, Farabow, Garrett & Dunner, L.L.P.

(57) ABSTRACT

An in-vehicle apparatus including: an apparatus body; a front surface of the apparatus body; and a lid configured to open and close the front surface. A microphone directed to the front side of the front surface in the condition where the lid is opened is provided at the front surface of the apparatus body. A gap for communication between the location, where the microphone is provided, of the front surface and the outside is secured between the front surface and the lid in the condition where the front surface of the apparatus body is closed with the lid.

19 Claims, 23 Drawing Sheets

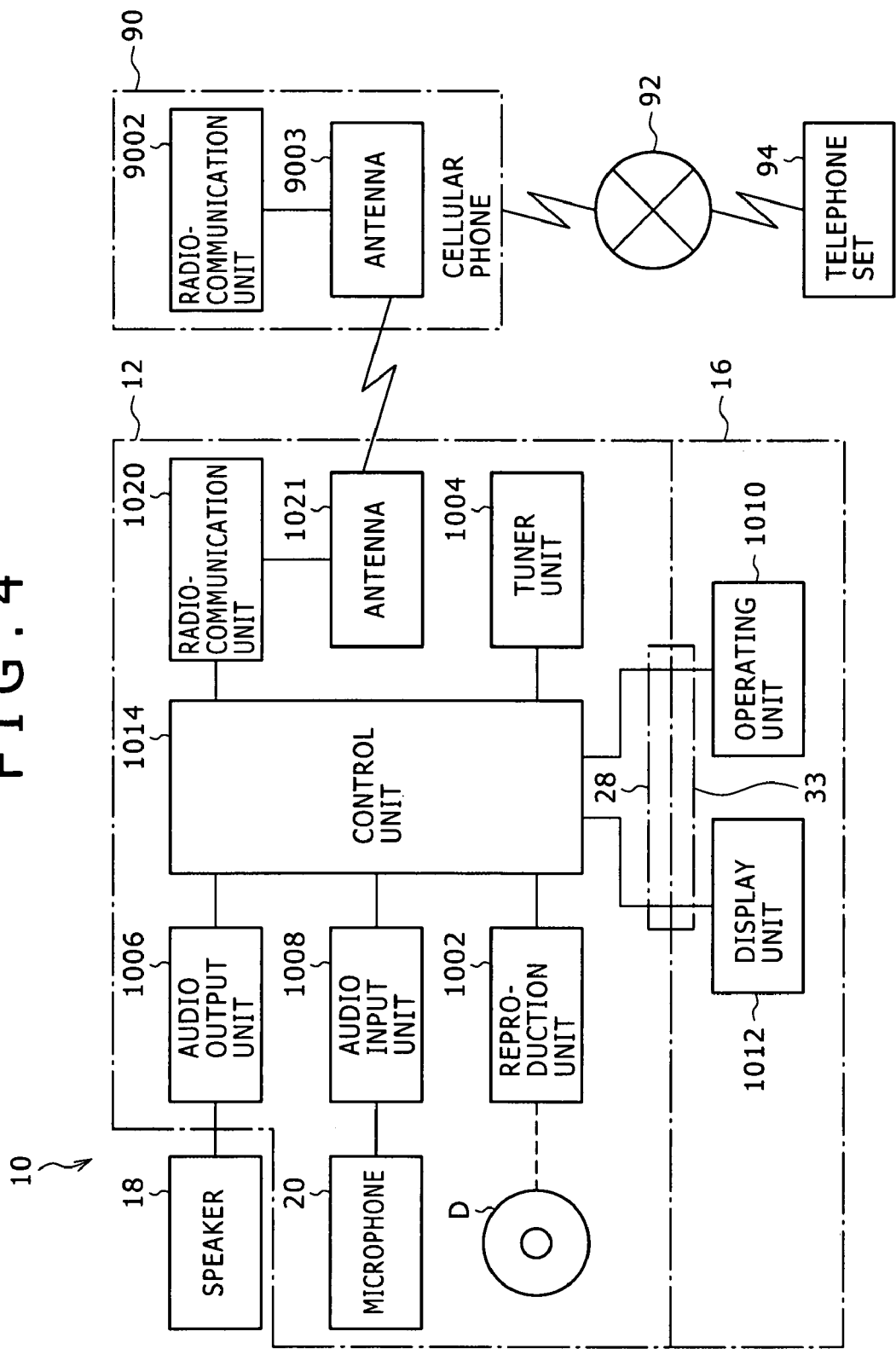

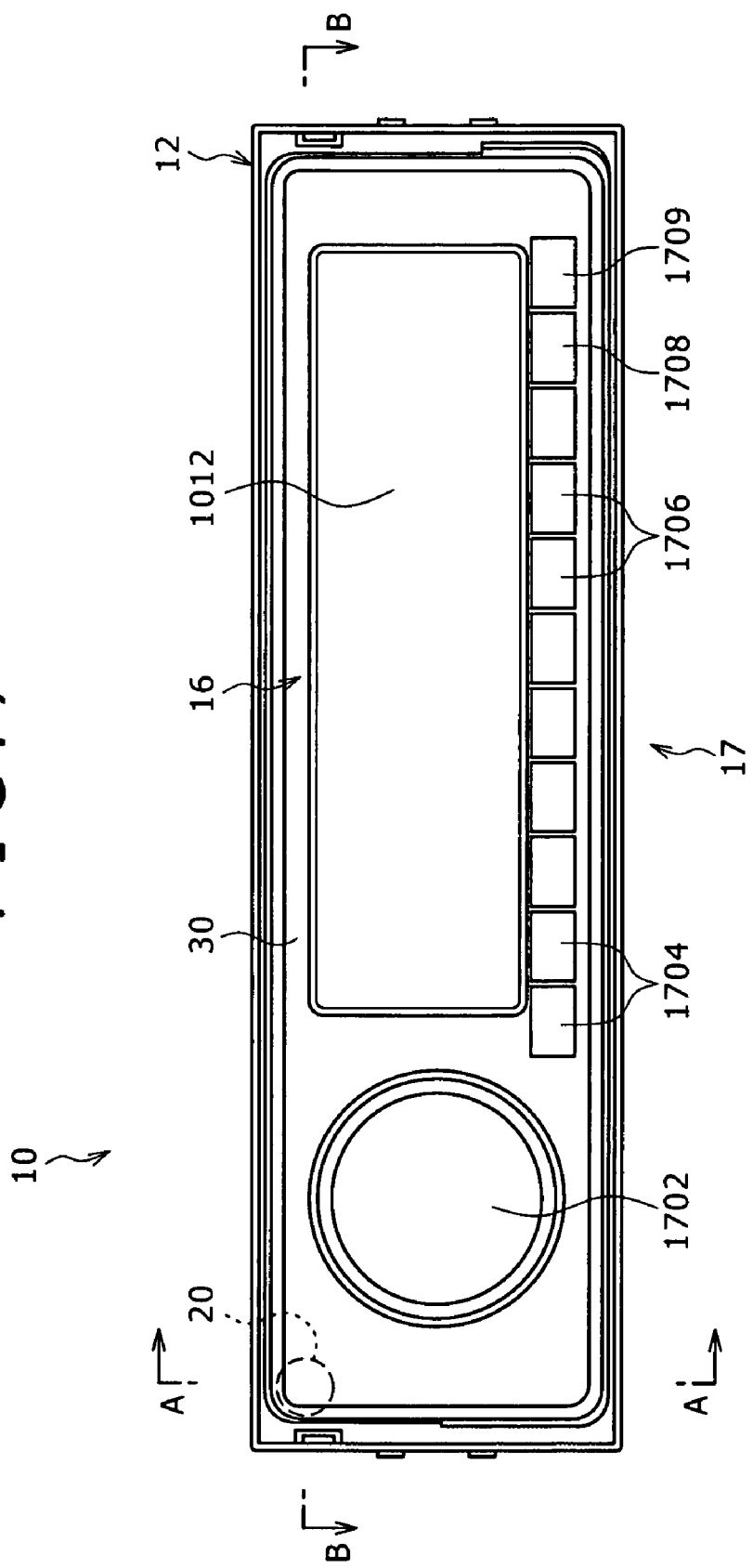

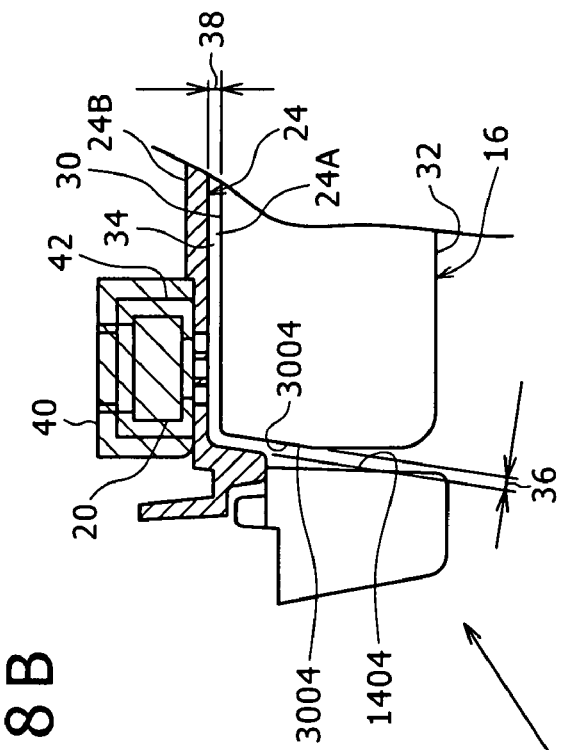
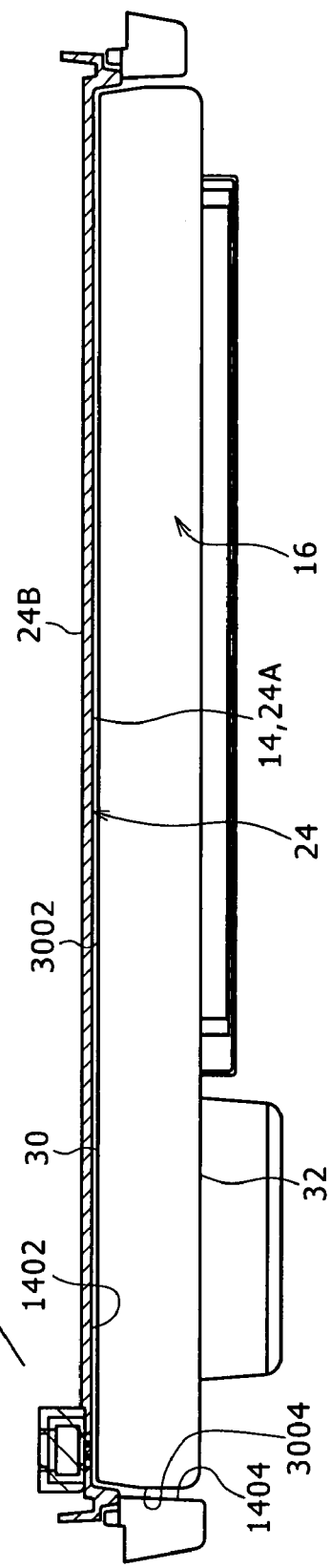
FIG. 8B
FIG. 8A

FIG.13D
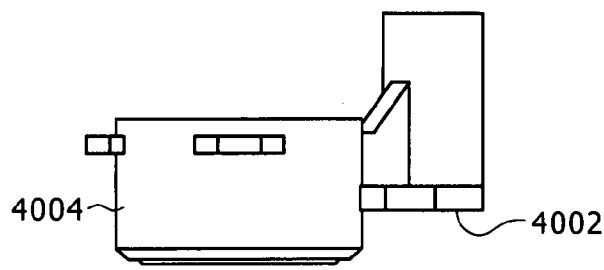
FIG.13B  FIG.13A  FIG.13C
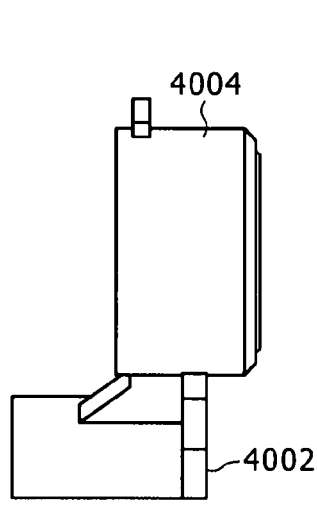 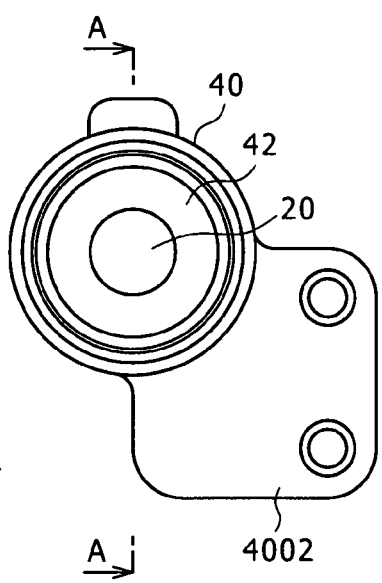 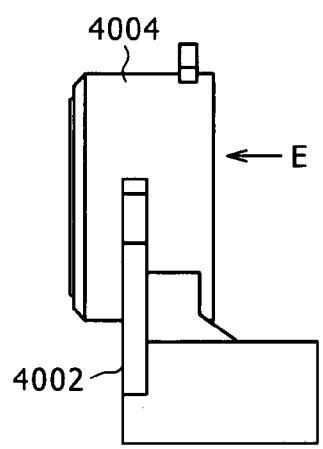
FIG.13E
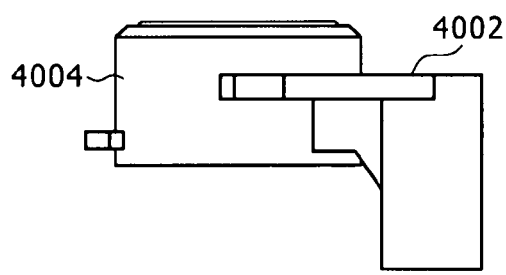

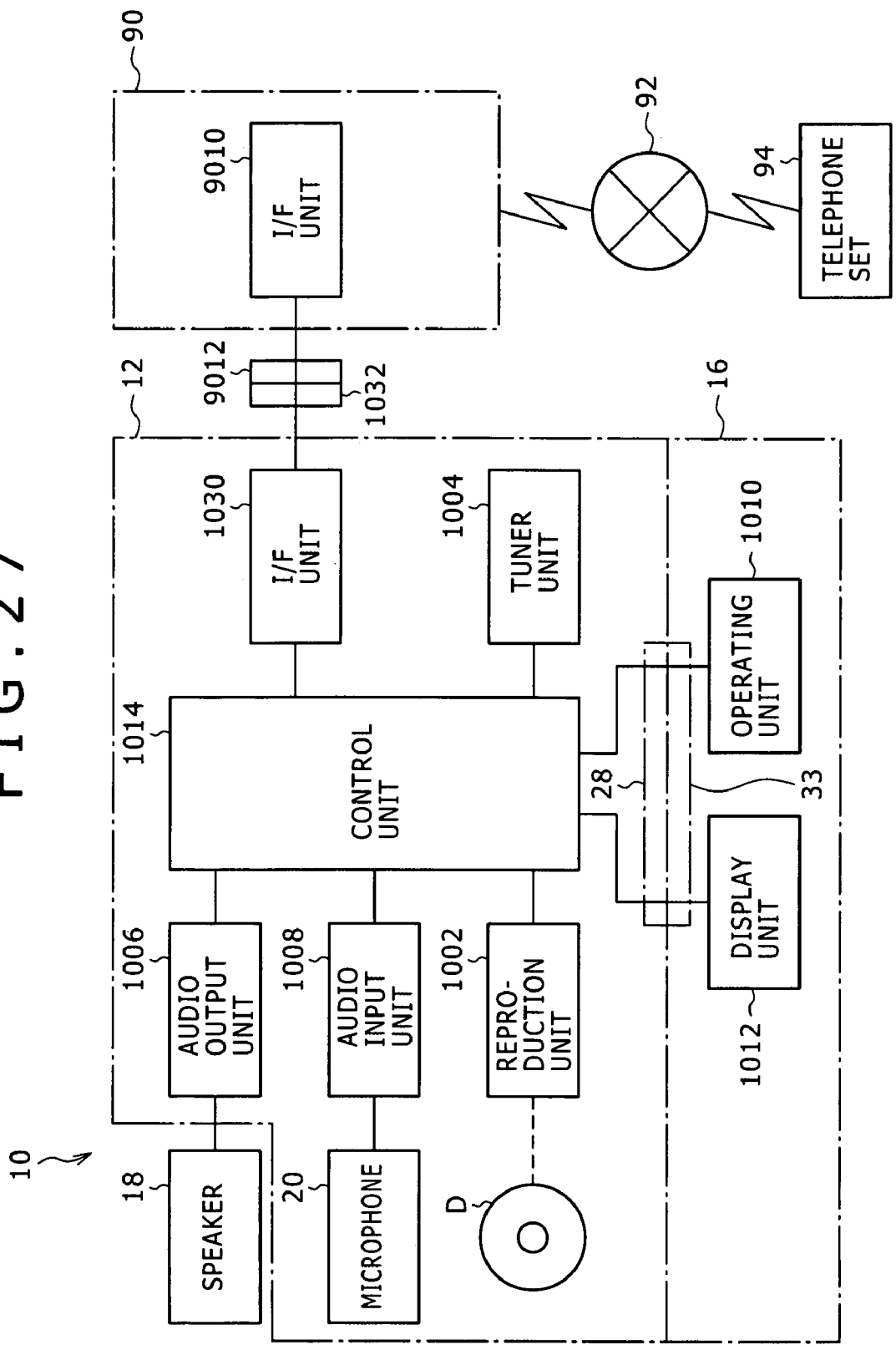

IN-VEHICLE APPARATUS

CROSS REFERENCES TO RELATED APPLICATIONS

The present invention contains subject matter related to Japanese Patent Application JP 2006-040495 filed with the Japanese Patent Office on Feb. 17, 2006, the entire contents of which being incorporated herein by reference.

BACKGROUND OF THE INVENTION

1. Field of the Invention

The present invention relates to an in-vehicle apparatus.

2. Description of the Related Art

There has been provided a hands-free conversation system which is disposed in a compartment of an automobile and through which talking can be performed without holding a cellular phone by hand (refer to Japanese Patent Laid-open No. 2001-103547).

The hands-free conversation system has a microphone for picking up a sound (voice) and a speaker for generating a sound (voice), which are connected to a cellular phone through a wired circuit or a wireless circuit so as to enable communication. The user can perform hands-free conversation in the compartment by use of the microphone and the speaker.

In recent years, in-vehicle apparatuses such as a car audio system incorporating such a hands-free taking system have been provided.

The in-vehicle apparatus is incorporated in a dashboard, a center console panel or the like provided in a vehicle compartment, and the microphone is attached to a location, remote from the in-vehicle apparatus, in the vehicle compartment or to a location where the in-vehicle apparatus fronts on the vehicle compartment.

SUMMARY OF THE INVENTION

Where the microphone is attached to a location, remote from the in-vehicle apparatus, in the vehicle compartment, it is unnecessary to incorporate the microphone in the case of the in-vehicle apparatus, which is advantageous from the viewpoint of securing the degree of freedom in designing the case. However, since the microphone and the in-vehicle apparatus are connected to each other by a wiring member, there is need for the laying space for the wiring member. Besides, there is a disadvantage that laying-around of the wiring member is intricate.

On the other hand, where the microphone is attached to the in-vehicle apparatus, the problems concerning the laying space for the wiring member and laying-around of the wiring member are dissolved. However, in order to pick up the sound (voice) with good tone quality, it would be necessary to provide the appearance surface (design surface) of the in-vehicle apparatus with a hole or opening for guiding the sound to the microphone, which is disadvantageous from the viewpoint of enhancing the appearance quality and enhancing the degree of freedom in design.

Thus, there is a need for an in-vehicle apparatus which unnecessitates a wiring member for disposing a microphone and which is advantageous in view of securing the degree of freedom in designing.

According to an embodiment of the present invention, there is provided an in-vehicle apparatus including: an apparatus body; a front surface of the apparatus body; and a lid configured to open and close the front surface. A microphone directed to the front side of the front surface in the condition where the lid is opened is provided at the front surface of the apparatus body, and a gap for communication between the location, where the microphone is provided, of the front surface and the outside is secured between the front surface and the lid in the condition where the front surface of the apparatus body is closed with the lid.

According to the embodiment of the present invention, the gap for communication between the location, where the microphone is provided, of the front surface of the apparatus body and the outside is secured between the front surface and the lid in the condition where the front surface is closed with the lid. Therefore, notwithstanding the front surface of the front panel is closed with the lid, the voice generated by the user can reach the microphone through the gap, to be picked up.

Therefore, unlike in the case where the microphone is attached to a location in the vehicle compartment remote from the in-vehicle apparatus, there is no need for a wiring member for connection between the microphone and the in-vehicle apparatus, so that the need for a laying space for a wiring member is eliminated, and the work of arranging the in-vehicle apparatus can be carried out easily. In addition, it is unnecessary for the outside surface of the lid where the in-vehicle apparatus fronts on the vehicle compartment to be provided with a hole or opening for guiding a sound to the microphone, which is advantageous in view of enhancing the appearance quality and enhancing the degree of freedom in design.

BRIEF DESCRIPTION OF THE DRAWINGS

FIG. 4 is a bock diagram showing the configuration of a control system in the in-vehicle apparatus according to a first embodiment of the present invention;

FIG. 7 is a front view of the in-vehicle apparatus;

FIG. 8A is a sectional view taken along line A-A of FIG. 7, and FIG. 8B is an enlarged view of a main part of FIG. 8A;

FIG. 13A is a plan view of the holder, FIG. 13B is a view taken along line B of FIG. 13A, FIG. 13C is a view taken along arrow C of FIG. 13A, FIG. 13D is a view taken along arrow D, and FIG. 13E is a view taken along arrow E of FIG. 13A;

FIG. 27 is a block diagram showing the configuration of a control system in the in-vehicle apparatus according to a second embodiment of the present invention.

DETAILED DESCRIPTION OF THE PREFERRED EMBODIMENTS

Figure 1:
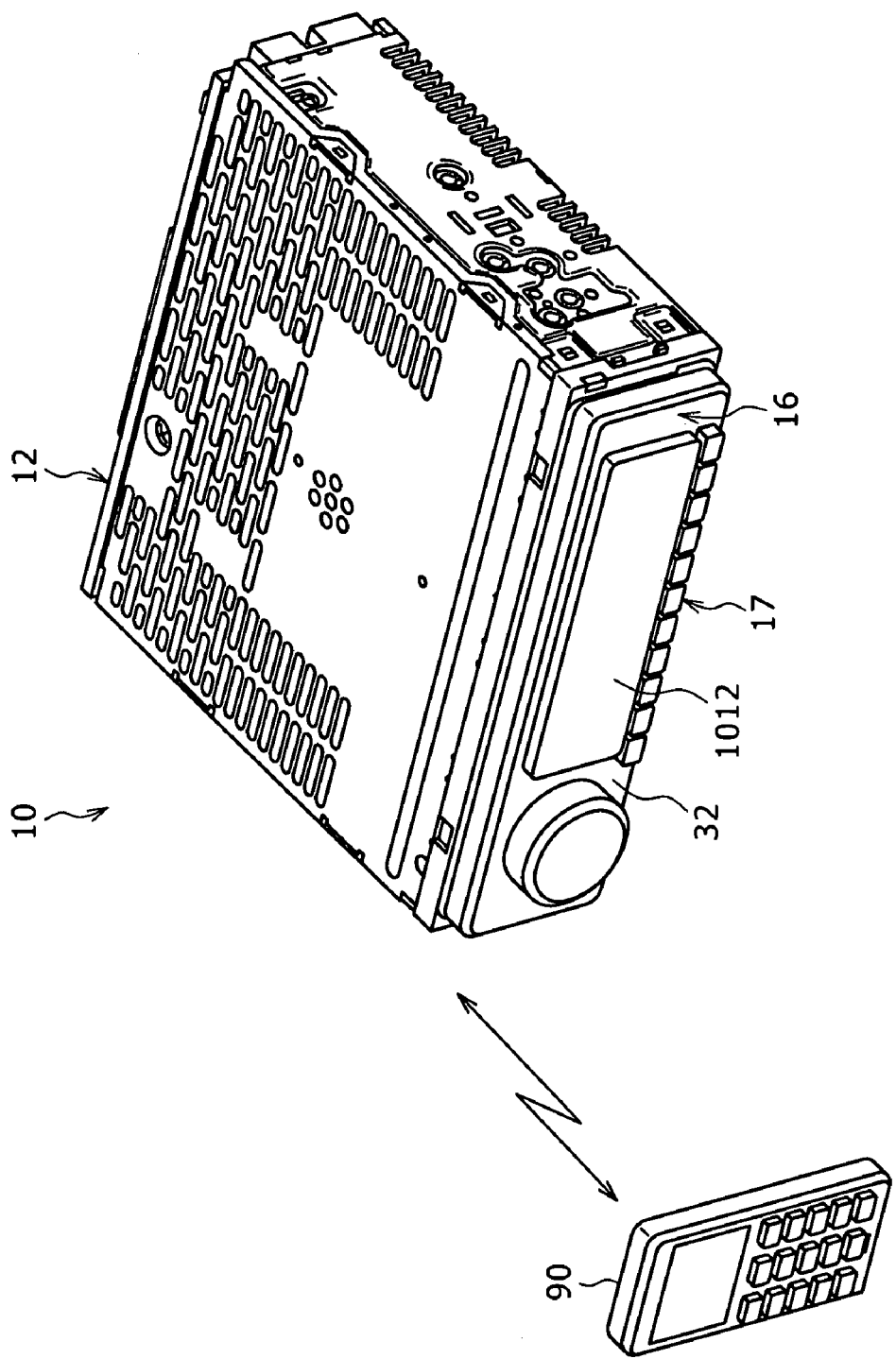
FIG. 1 is a perspective view of an in-vehicle apparatus according to an embodiment of the present invention.

Now, an embodiment of the present invention will be described below referring to the drawings.

Figure 2:
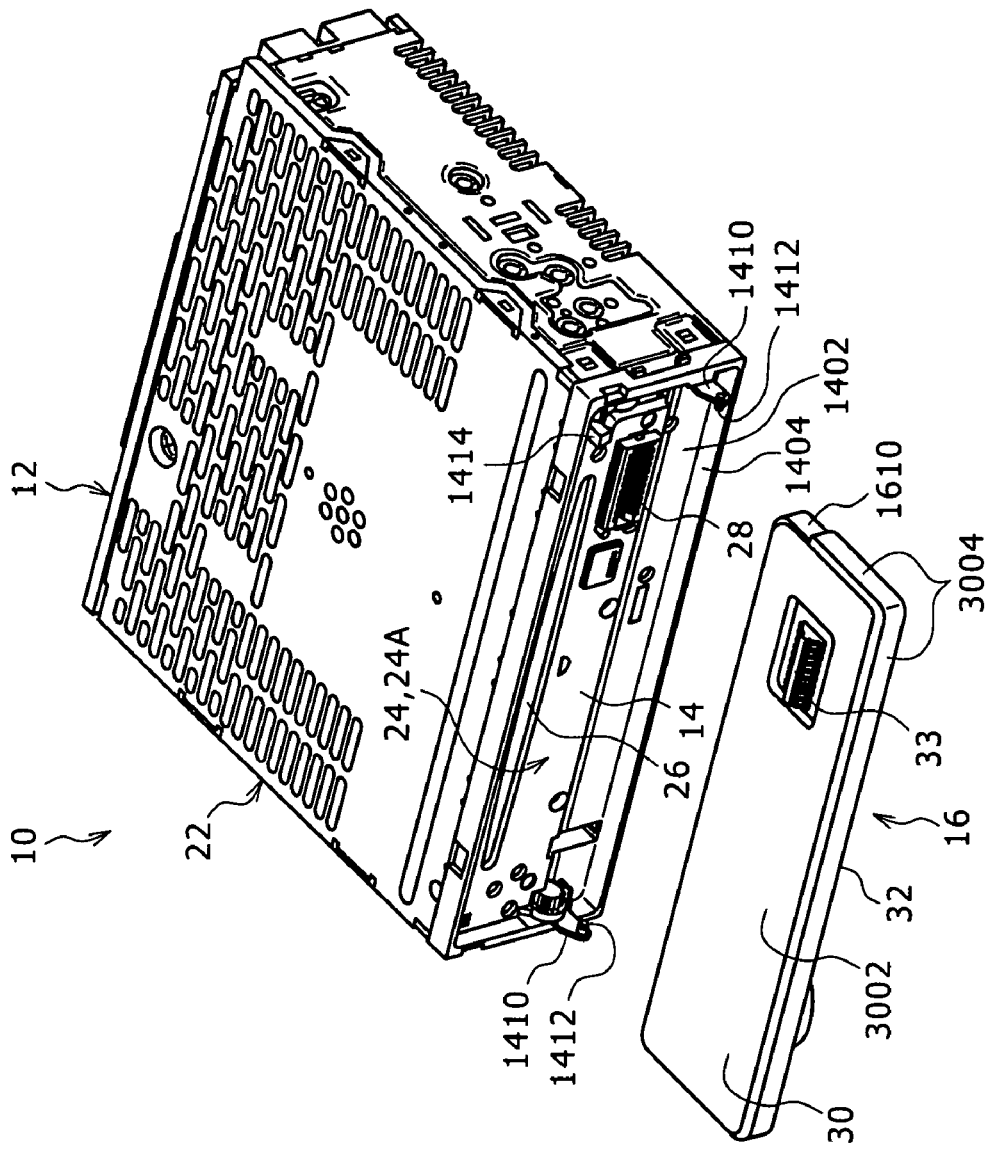
FIG. 2 is a view showing the condition where a lid is detached from an apparatus body of the in-vehicle apparatus.
Figure 3:
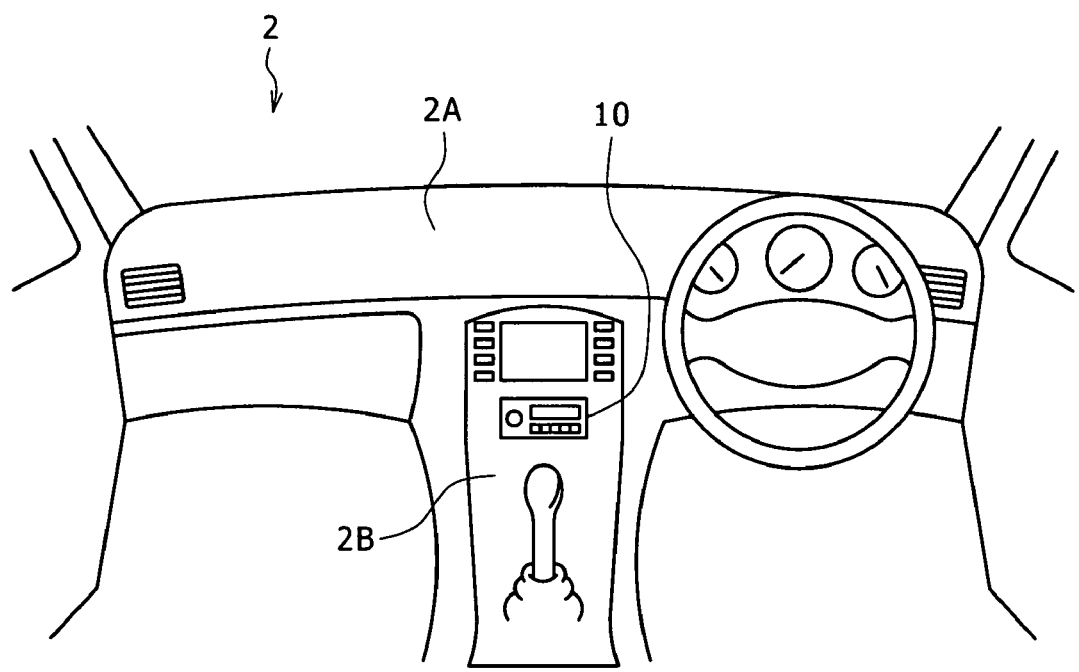
FIG. 3 illustrates the condition where the in-vehicle apparatus is installed in a vehicle compartment.

FIG. 1 is a perspective view of an in-vehicle apparatus 10 according to this embodiment of the present invention, FIG. 2 is a view showing the condition where a lid 16 is detached from an apparatus body 12 of the in-vehicle apparatus 10, FIG. 3 illustrates the condition where the in-vehicle apparatus 10 is installed in a vehicle compartment, and FIG. 4 is a block diagram showing the configuration of a control system in the in-vehicle apparatus 10.

As shown in FIGS. 1 and 2, the in-vehicle apparatus 10 in this embodiment is a car audio system used in the manner of loading and unloading a disk-formed recording medium (optical disk) such as CD, MD, DVD, etc., and the car audio system is provided with a hands-free conversation system for performing hands-free conversation through a cellular phone 90.

The in-vehicle apparatus 10 includes the apparatus body 12, and the lid 16 for opening and closing a front surface 14 of the apparatus body 12.

As shown in FIG. 3, the apparatus body 12 is incorporated in a location of a vehicle body, such as a dashboard 2A and a center console panel 2B located in the vehicle compartment 2, and the front surface 14 of the apparatus body 12 is set fronting on the vehicle compartment 2.

As shown in FIG. 4, a main part of the car audio system includes, for example, a reproduction unit 1002, a tuner unit 1004, an audio output unit 1006, an audio input unit 1008, an operating unit 1010, a display unit 1012, a control unit 1014 and the like.

The reproduction unit 1002 is a unit for reproduction of data, such as audio data, recorded on the disk-formed recording medium D such as CD, MD, DVD, etc. and for outputting an audio signal or the like. Incidentally, a recording/reproduction unit for recording and reproduction of data on the disk-formed recording medium D may be provided, in place of the reproduction unit 1002.

The tuner unit 1004 is a unit for receiving electromagnetic waves such as AM waves and FM waves transmitted from radio broadcasting stations and for outputting an audio signal.

The audio output unit 1006 is a unit for applying predetermined signal processings inclusive of amplification to the audio signal supplied through the control unit 1014 and for supplying the processed signal to a speaker 18 incorporated in the vehicle compartment 2, to thereby generate a sound from the speaker 18.

The audio input unit 1008 is a unit for applying predetermined signal processings inclusive of amplification to an audio signal supplied through a microphone 20 incorporated in the apparatus body 12 and for supplying the processed signal to the control unit 1014.

The operating unit 1010 is a unit operated to give commands for operations of the reproduction unit 1002, the tuner unit 1004, the audio output unit 1006, and the audio input unit 1008, and control signals according to operations on the operating unit 1010 are supplied to the control unit 1014.

The display unit 1012 is a unit for displaying the operating conditions of the reproduction unit 1002, the tuner unit 1004, the audio output unit 1006, the audio input unit 1008 and the like by use of characters, symbols, icons, or images or the like, based on the control conducted by the control unit 1014.

The control unit 1014 is a unit for controlling the reproduction unit 1002, the tuner unit 1004, the audio output unit 1006, the audio input unit 1008, the operating unit 1010, and the display unit 1012.

Incidentally, in this embodiment, the reproduction unit 1002, the tuner unit 1004, the audio output unit 1006, the audio input unit 1008, and the control unit 1014 are provided in the apparatus body 12, while the operating unit 1010 and the display unit 1012 are provided in the lid 16.

The hands-free conversation system includes the speaker 18, the microphone 20, the audio output unit 1006, the audio input unit 1008, a radiocommunication unit 1020, and the control unit 1014.

The radiocommunication unit 1020, provided in the apparatus body 12, is for performing communication (talking) by radio between itself and a radiocommunication unit 9002 provided in a cellular phone 90 carried by the user.

Incidentally, the radiocommunication units 1020 and 9002 are provided respectively with antennas 1021 and 9003 for Bluetooth radiocommunication.

In this embodiment, the Bluetooth radiocommunication is used as radiocommunication. Incidentally, other radiocommunications than the Bluetooth radiocommunication, radiocommunication using IR rays or the like may also be naturally adopted as radiocommunication.

The cellular phone 90 is brought into the vehicle compartment 2 by the user. When a communication line is established between the cellular phone 90 and a telephone set 94 on the other end side of line through a public telephone network 92 in the condition where a communication line is established through the radiocommunication unit 9002 in the cellular phone 90 and the radiocommunication unit 1020 of the hands-free conversation system, hands-free conversation can be made with the telephone set 94 on the other end side of line by use of the hands-free conversation system. Incidentally, the telephone set 94 on the other end side of line may naturally be a cellular phone or a fixed telephone set.

Specifically, the control unit 1014 so controls that voice (sound) transmitted from the telephone set 94 on the other end side of line through the public telephone network 92 and the radiocommunication units 9002, 1020 is received and is generated as voice by the audio output unit 1006 and the speaker 18, whereas the user's voice is transmitted to the telephone set 94 on the other end side of line through the microphone 20, the audio input unit 1008, the radiocommunication units 1020, 9002 and the public telephone network 92.

Therefore, in this embodiment, the speaker 18 constitutes a part of a receiver unit for listening the voice in the hands-free system, and the microphone 20 constitutes a part of a transmitter unit for picking up the voice in the hands-free system.

As shown in FIG. 2, the apparatus body 2 has a casing 22 assuming a flat regular parallelepiped shape.

Figure 6:
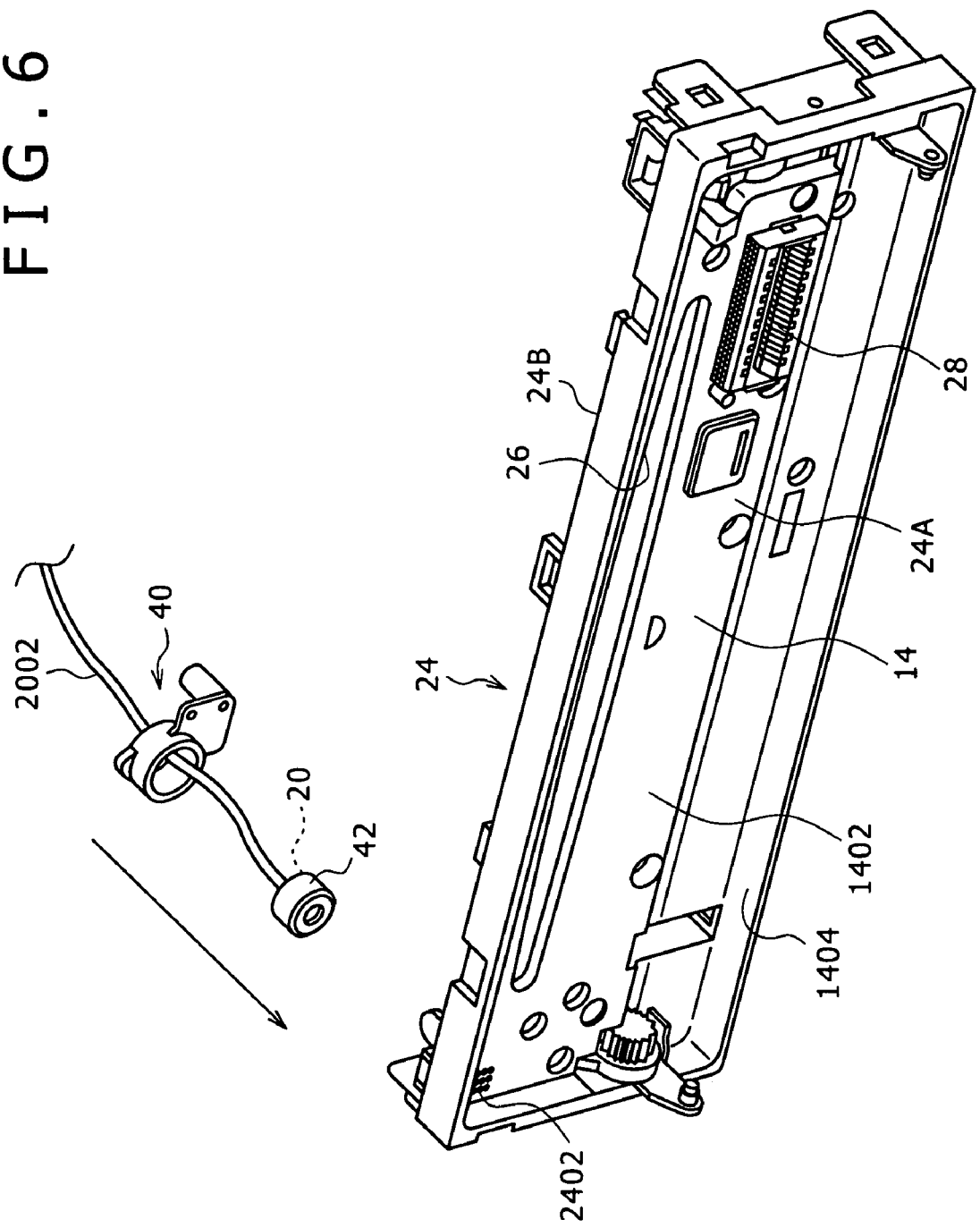
FIG. 6 illustrates the assembly of a microphone onto a front panel.

The front surface 14 of the apparatus body 12 is an outside surface 24 of a front panel 24 constituting a front part of the casing 22, and, as shown in FIG. 6, the front panel 24 has an inside surface 24B fronting on the inside of the casing 22.

The front surface 14 has a rectangular shape elongate in the left-right direction. The front surface 14 is provided with a loading/unloading gate 26 for the disk-formed recording medium, and with an apparatus body side connector 28 connected to the control unit 1014.

The front surface 14 has a horizontally elongate front surface part 1402, and a side surface part 1404 rising from the periphery of the front surface part 1402.

In this embodiment, the front panel 24 is composed of a molding of a synthetic resin material. As the synthetic resin material, for example, an ABS resin can be used.

As shown in FIGS. 1 and 2, the lid 16 is for opening and closing the front surface 14 of the apparatus body 12. The lid 16 has a back surface 30 fronting on the front surface 14 of the apparatus body 12 in the state of closing the front surface 14, and a front surface 32 fronting on the inside of the vehicle compartment 2 (i.e., fronting on the outside of the apparatus body 12).

The back surface 30 of the lid 16 has a back surface part 3002 fronting on the front surface part 1402, and a side surface part 3004 rising from the periphery of the back surface part 3002 and fronting on the side surface part 1404.

A plurality of operating members 17 for operating the apparatus body 12 are disposed at the front surface of the lid 16, and the operating members 17 constitute the operating unit 1010.

For example, as shown in FIG. 7, the operating members 17 include a volume control 1702 for controlling the volume of the sound generated from the speaker 18, operating switches 1704 for starting and stopping of reproduction of the disk-formed recording medium D, selection of a tune, fast forward feed, fast reverse feed, and ejection of the disk-formed recording medium D, etc., and tuning switches 1706 for tuning in the tuner unit 1004. The operating members 17 further include a reception switch 1708 for performing a reception operation in the hands-free conversation, and a talk end switch 1709 for performing a talk ending operation in the hands-free conversation, and the like.

In addition, as shown in FIG. 2, a lid-side connector 33 is provided at the back surface 30 of the lid 16. As shown in FIG. 4, the lid-side connector 33 is engaged with the apparatus body side connector 28 in the condition where the front surface 14 is closed with the lid 16, and the lid-side connector 33 is disengaged from the apparatus body side connector 28 in the condition where the lid 16 is detached from the front surface 14.

The lid-side connector 33 has a plurality of contact pieces electrically connected to the operating members 17 and the display unit 1012, and the apparatus body side connector 28 has a plurality of contact pieces electrically connected to the control unit 1014.

By the engagement of the lid-side connector 33 with the apparatus body side connector 28, the contact pieces of the lid-side connector 33 are electrically connected to the contact pieces of the apparatus body side connector 28, whereby control signals are transferred between the control unit 1014 and the operating members 17 and the display unit 1012.

For the mechanism of the lid 16 for opening and closing the front surface 14 of the apparatus body 12, various configurations known in the past can be adopted.

Specifically, the lid 16 may be provided to be non-detachable or be detachable from the front surface 14 of the apparatus body 12. In the case where the lid 16 is provided to be non-detachable from the front surface 14, there are provided various known configurations such as a a system in which the lid 16 is swingable and a system in which the lid 16 is slidable. Even in the case where the lid 16 provided to be detachable, there are provided various known configurations such as a system in which the lid 16 is swingable or is slidable, in the condition where the lid 16 is connected to the front surface 14 of the apparatus body 12.

For example, FIGS. 1 and 2 show an example in which the lid 16 is provided to be detachable from the apparatus body 12.

To be more specific, flanges 1410 are provided projectingly from lower parts on both left and right sides of the front surface 14, shafts 1412 are projectingly provided at the tip ends of the left and right flanges 1410, and the shafts 1412 are disengageably joined to shaft receiving holes 1610 in lower parts of left and right side surfaces of the lid 16, whereby the lid 16 can be swung about the shafts 1412. With the lid 16 swung upward and with the lid 16 adjusted to the front surface 14, a lock pawl 1414 is engaged with an upper part of the lid 16, and the closed state of the front surface 14 is maintained. With an unlocking button depressed, the lock pawl 1414 is disengaged, to permit the lid 16 to be swingable in the direction of spacing away from the front surface 14, whereby an opened state of the front surface is obtained. This detachable system is advantageous from the viewpoint of detaching the lid 16 from the apparatus body 12 when the user departs from the automobile, so as to prevent the in-vehicle apparatus 10 from being stolen.

Figure 17:
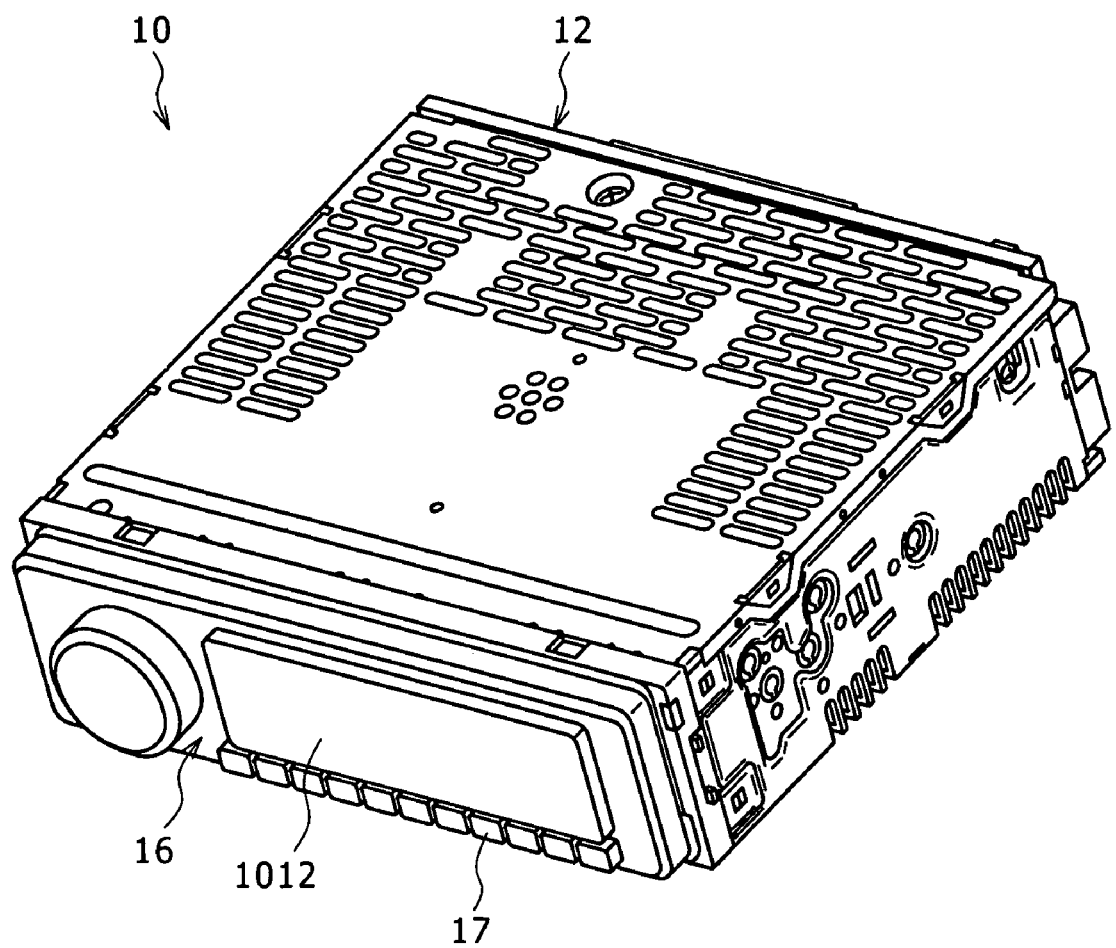
FIG. 17 is a perspective view showing an example in which a lower part of the lid is swingably provided at a lower part of the apparatus body.
Figure 18:
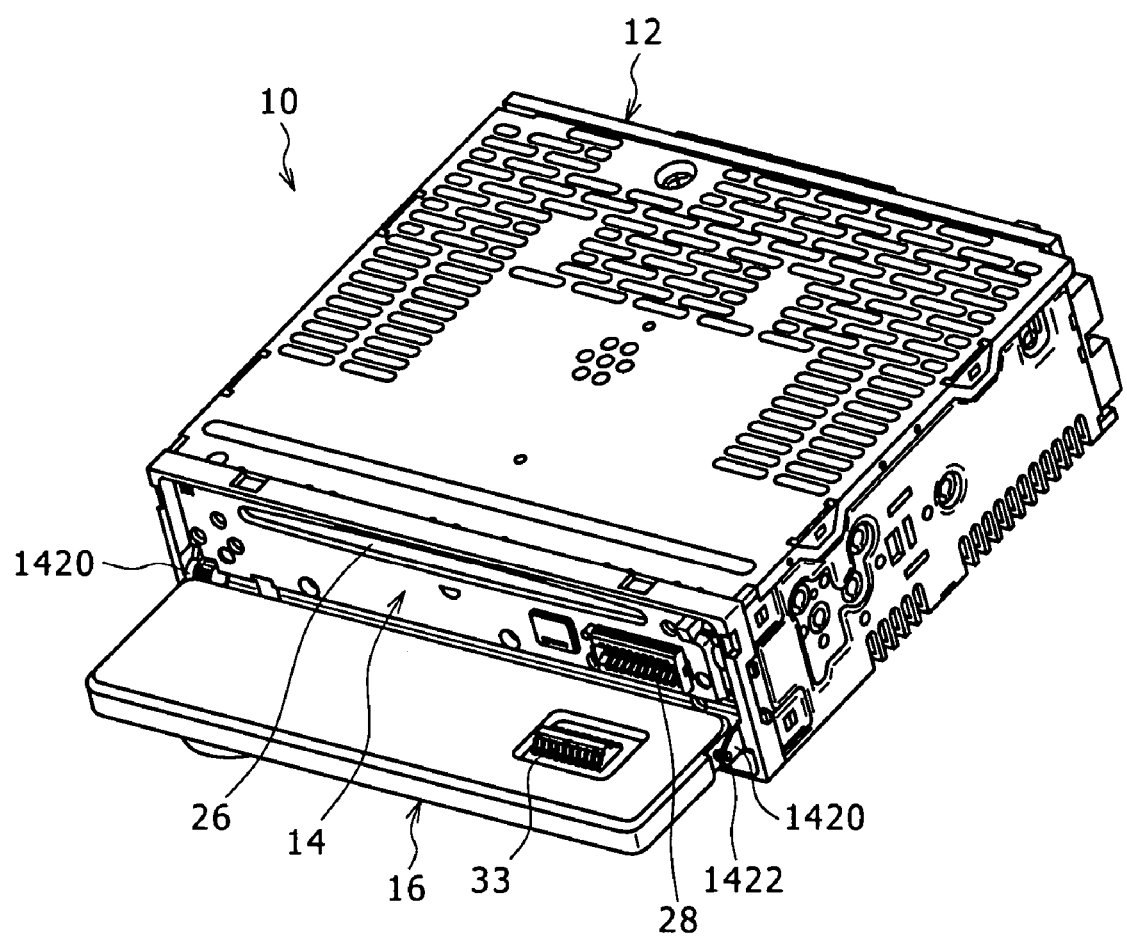
FIG. 18 is another perspective view showing an example in which a lower part of the lid is swingably provided at a lower part of the apparatus body.

FIGS. 17 and 18 show an example in which the lid 16 is non-detachable from the apparatus body 12 and in which a lower part of the lid 16 is swingably connected to a lower part of the apparatus body 12.

Specifically, flanges 1420 are provided projectingly from lower parts on both left and right sides of the front surface 14, the tip ends of the left and right flanges 1420 are connected to lower parts of left and right side surfaces of the lid 16 through shafts 1422, and the lid 16 is swung about the shafts 1422, so as to open and close the front surface 14.

Figure 19:
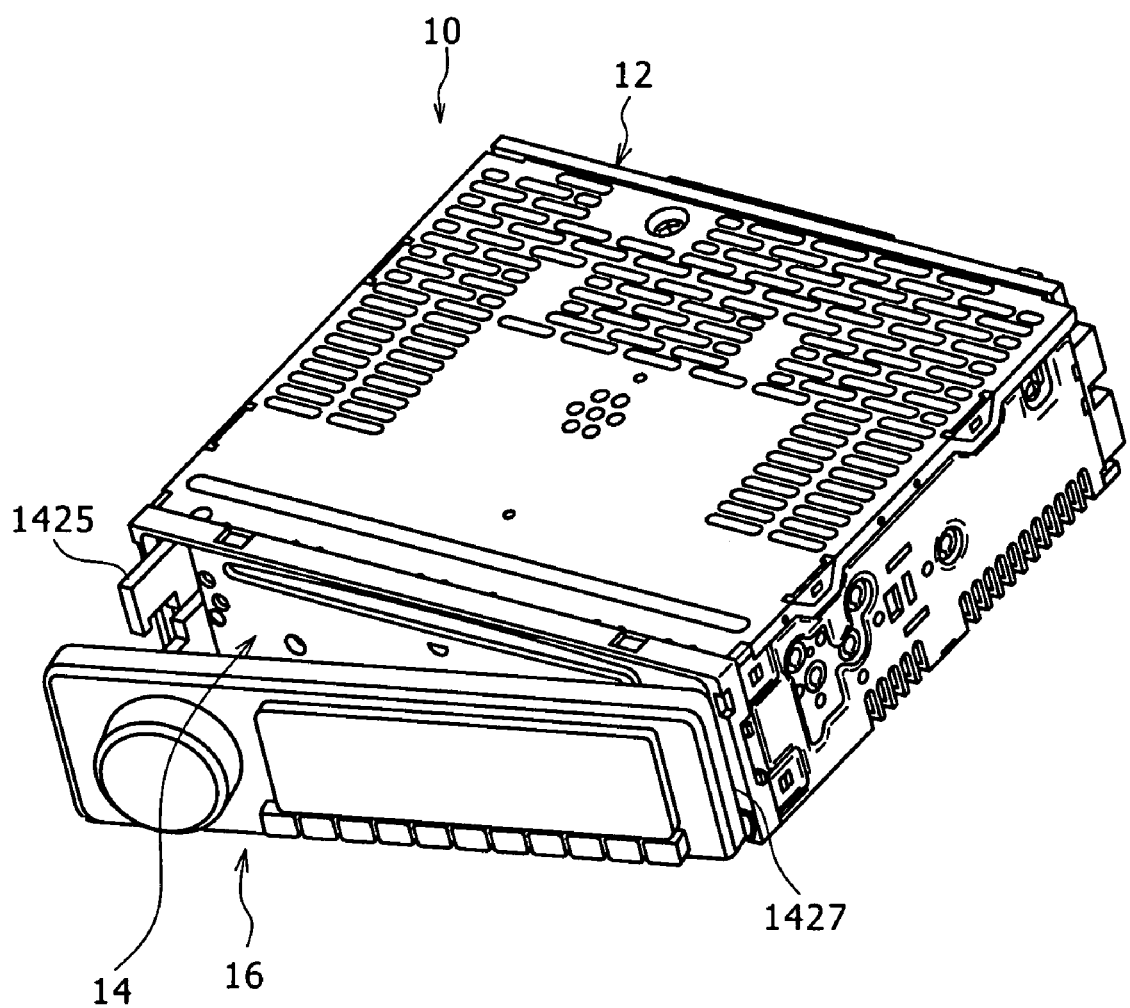
FIG. 19 is a perspective view showing an example in which the lid is detached from the apparatus body.
Figure 20:
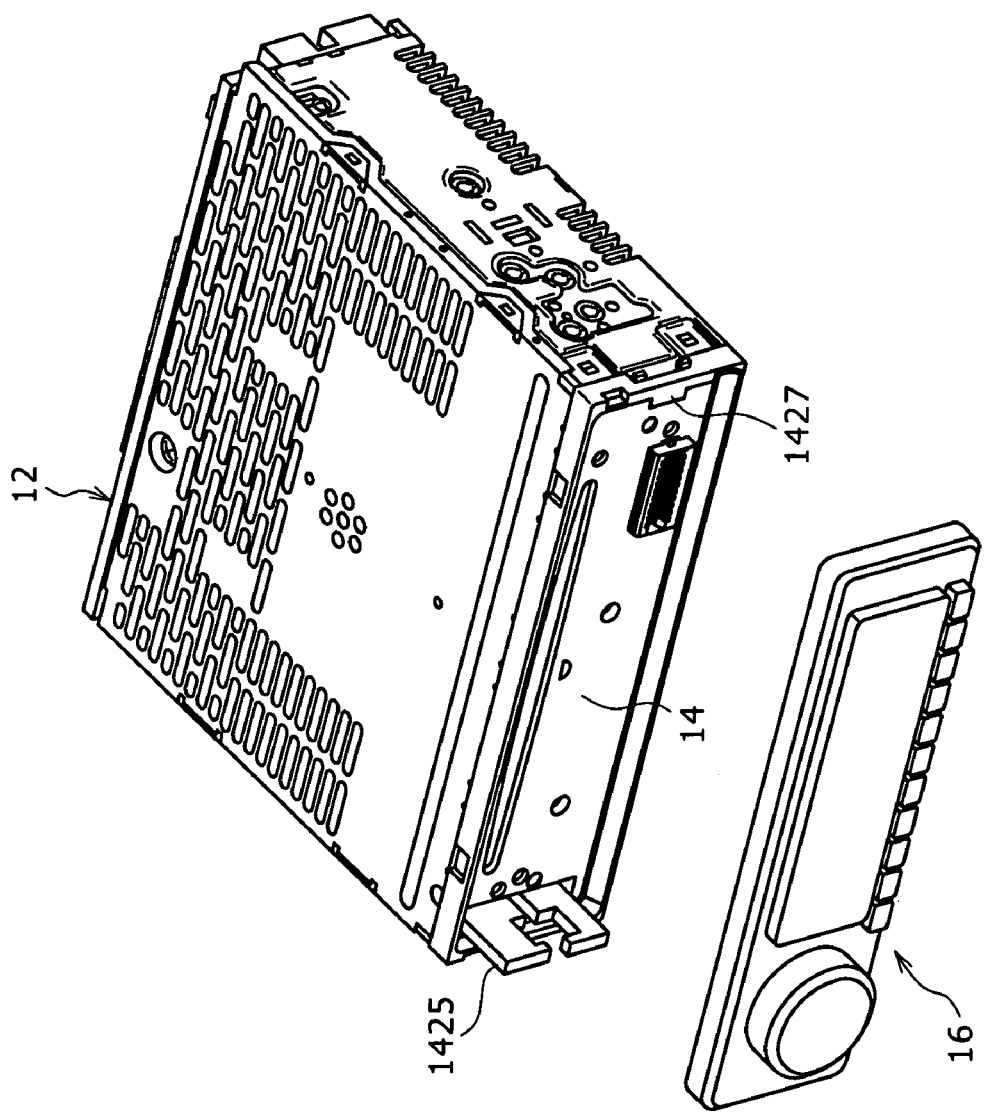
FIG. 20 is another perspective view showing an example in which the lid is detached from the apparatus body.

FIGS. 19 and 20 show a modification of the example shown in FIGS. 1 and 2, in which the lid 16 is provided to be detachable from the apparatus body 12.

Specifically, with the lid 16 matched to the front surface 14, a lock pawl 1425 is engaged with a left side part of the lid 16, whereby the closed state of the front surface 14 as shown in FIGS. 1 and 17 is maintained. With an unlocking button depressed, the lock pawl 1425 is disengaged, to permit the lid 16 to be swung with a lock piece 1427 at a right side part of the apparatus body 12 as a fulcrum; then, with an engaging part of the lid 16 disengaged from the lock piece 1427, the lid 16 is detached.

Figure 21:
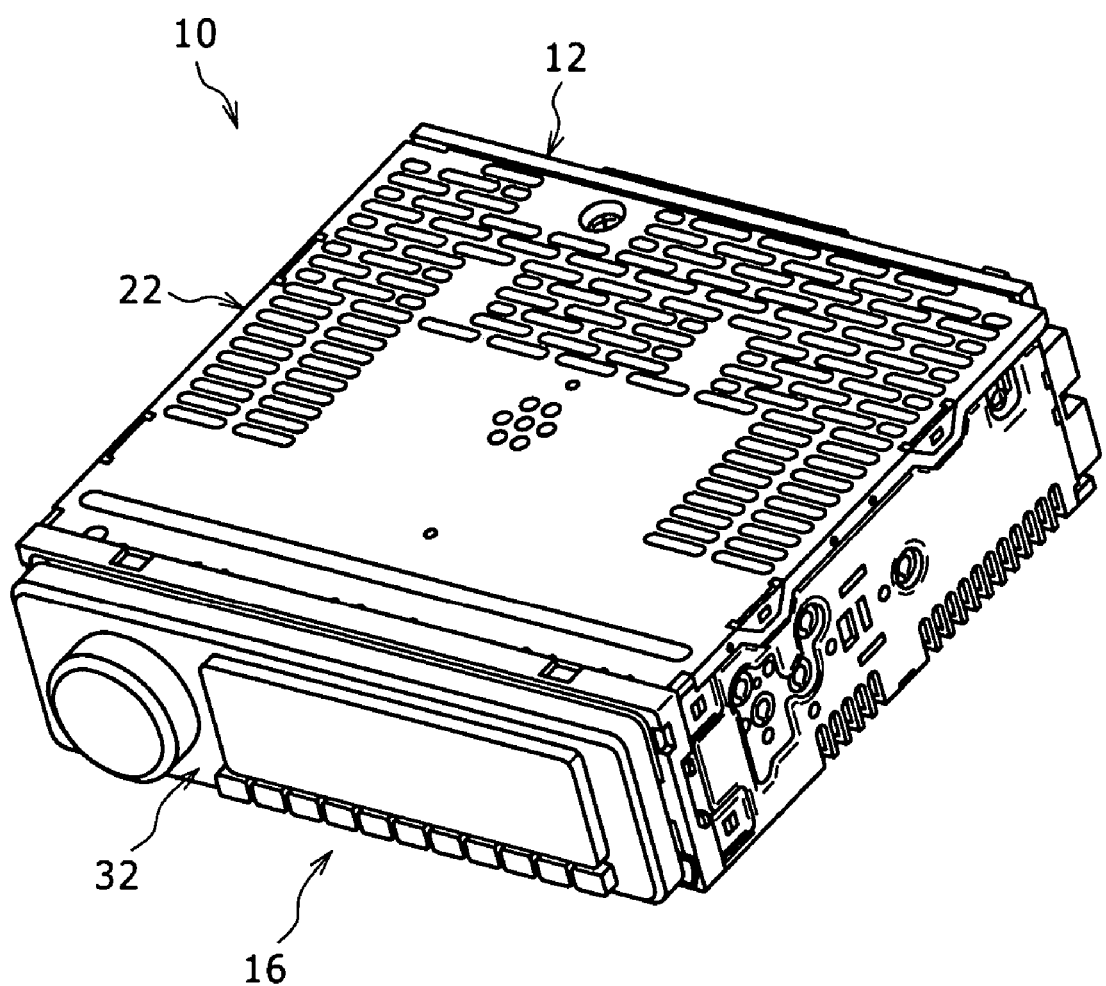
FIG. 21 is a perspective view showing an example in which the lid is slid relative to a front surface.
Figure 22:
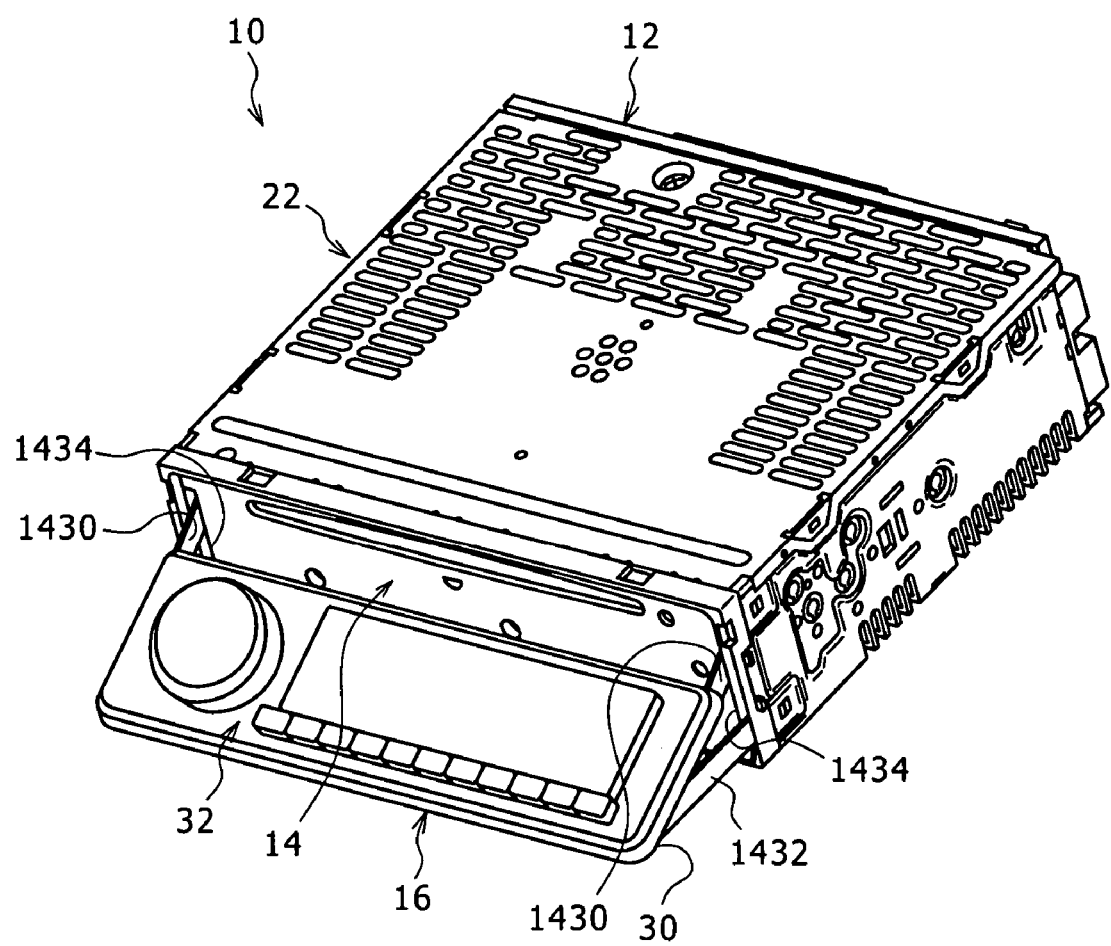
FIG. 22 is another perspective view showing the example in which the lid is slid relative to the front surface.

FIGS. 21 and 22 show an example in which the lid 16 is slidable relative to the front surface 14.

Specifically, the front end of an upper link 1430 and the front end of a lower link 1432 are rotatably supported respectively by upper and lower parts of both left and right side parts of the back surface 30 of the lid 16. The rear end of the upper link 1430 and the rear end of the lower link 1432 are engaged with guide grooves 1434 formed in the apparatus body 12.

The opening of the front surface 14 starting from the closed state of the front surface 14 is conducted by sliding a lower part of the lid 16 to the front side, moving an upper part of the lid 16 downwards along the front surface of the apparatus body 12 and locating the upper part of the lid 16 to the front side of a lower part of the front surface 14. The closing of the front surface 14 starting from the opened state of the front surface 14 is conducted, in reverse to the above, by sliding the lower part of the lid 16 to the rear side, and moving the upper part of the lid 16 upwards along the front surface of the apparatus body 12. As this slide system, there are provided both a configuration in which the lid 16 is provided to be non-detachable from the front surface 14 of the apparatus body 12 and a configuration in which the lid 16 is provided to be detachable from the front surface 14.

Figure 23:
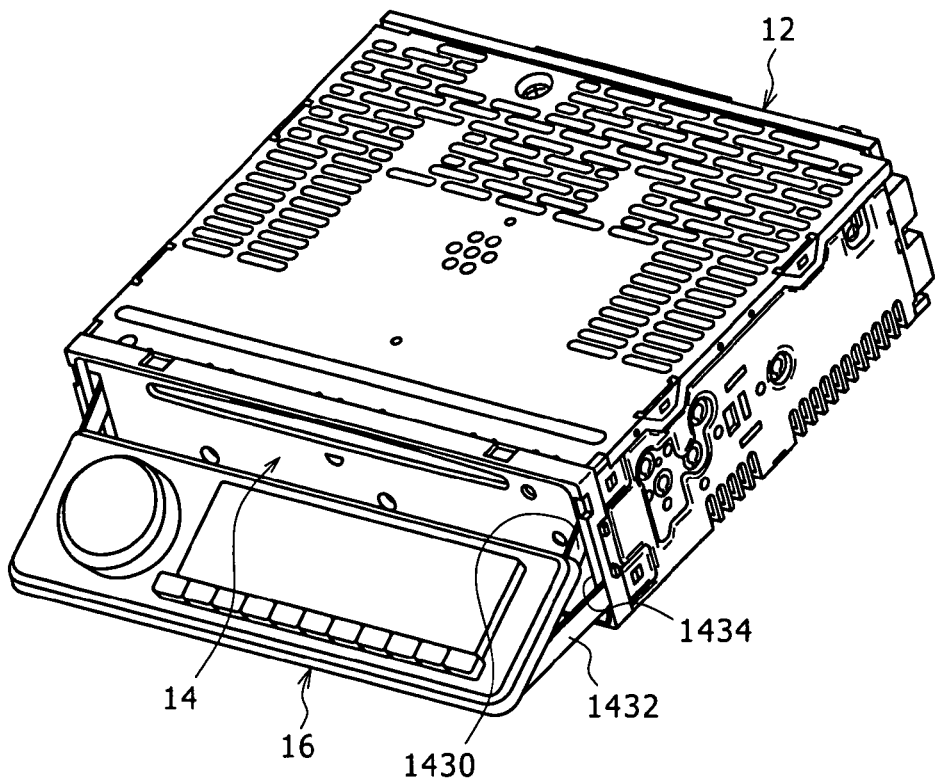
FIG. 23 is a further perspective view showing the example in which the lid is slid relative to the front surface.
Figure 24:
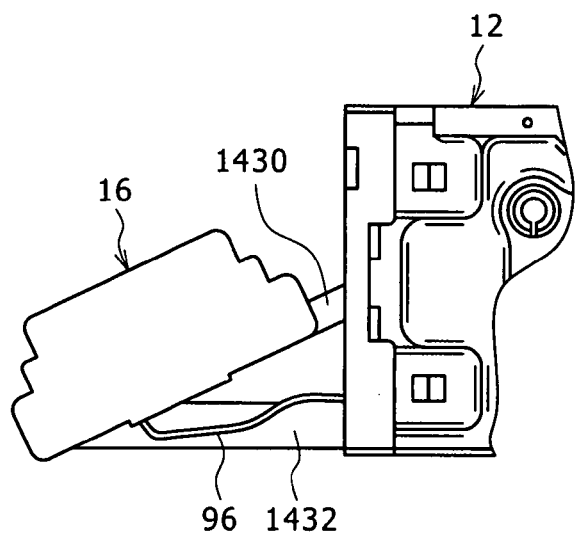
FIG. 24 is a side view showing the example in which the lid is slid relative to the front surface.

FIGS. 23 and 24 show a modification of the example shown in FIGS. 21 and 22. In this modified example, the movement of the lid 16 is the same as in the example of FIGS. 21 and 22, but the modified example differs from the example of FIGS. 21 and 22 in that the transfer of control signals between the control unit 1014 and the operating members 17 and the display unit 1012 is conducted by use of a flexible substrate 96, instead of using the lid-side connector 33 and the apparatus body side connector 28.

Figure 25:
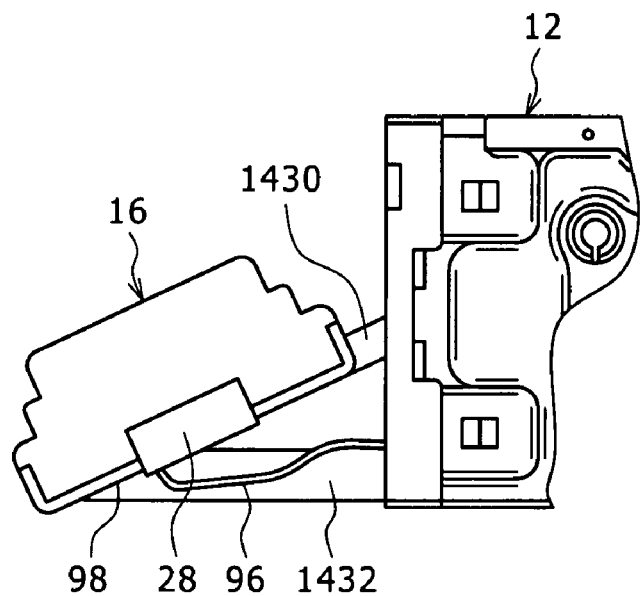
FIG. 25 is a side view showing an example in which the lid is detached from the apparatus body.
Figure 26:
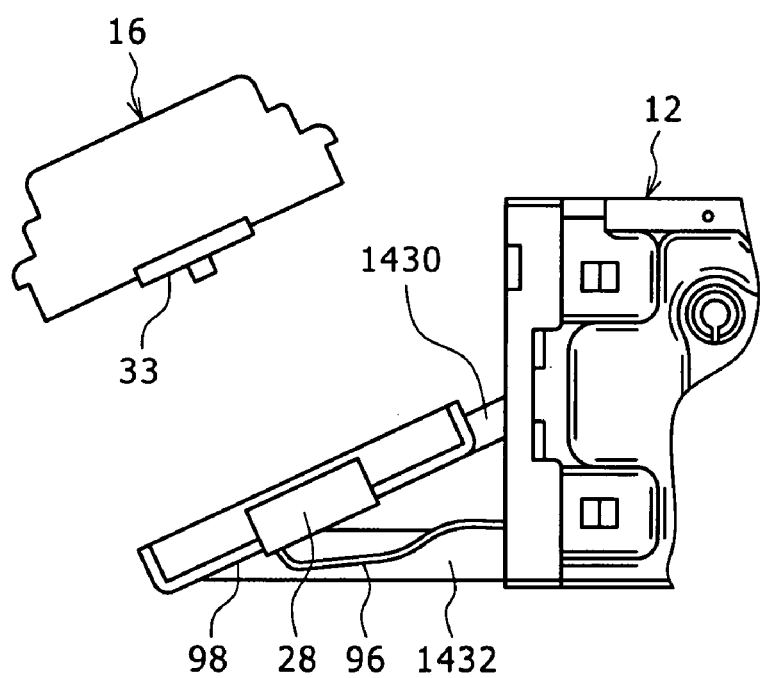
FIG. 26 is another side view showing the example in which the lid is detached from the apparatus body.

FIGS. 25 and 26 show a modification of an example shown in FIGS. 23 and 24. In this modified example, the flexible substrate 96 is used in the same manner as in the example of FIGS. 23 and 24, but this modified example differs from the example of FIGS. 23 and 24 in that the lid 16 is supported by a frame 98, and the lid 16 is detachably connected to the frame 98, in other words, the lid 16 is provided to be detachable from the apparatus body 12.

In this case, the lid 16 is provided with the lid-side connector 33, the frame 98 is provided with the apparatus body side connector 28, and the engagement and disengagement between the lid-side connector 33 and the apparatus body side connector 28 are conducted when the lid 16 is attached and detached.

Namely, in this example, the transfer of signals between the operating members 17 and the apparatus body 12 is conducted through the flexible substrate 96 as well as the lid-side connector 33 and the apparatus body side connector 28.

Figure 5A:
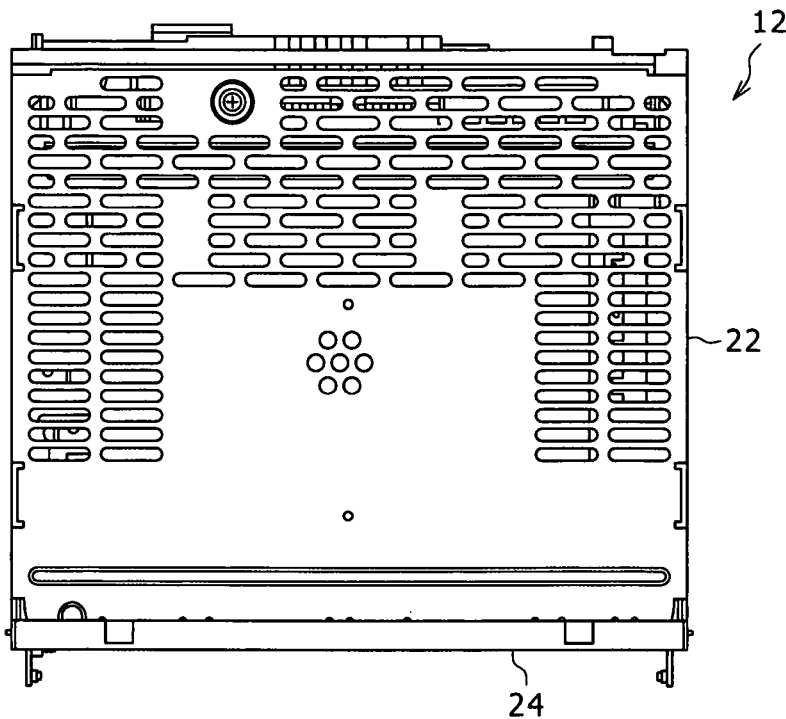
FIG. 5A is a plan view of the apparatus body.
Figure 5B:
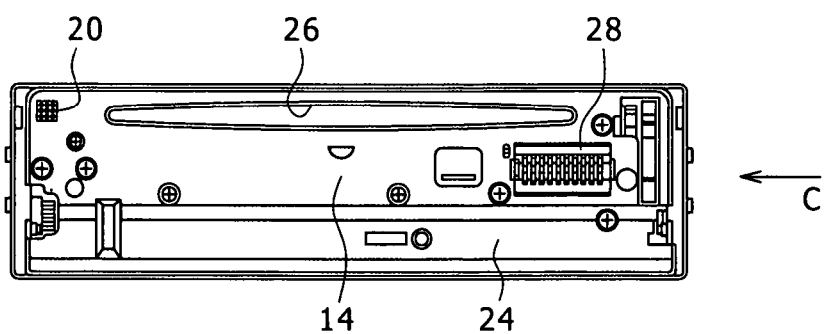
FIG. 5B is a front view of the apparatus body.
Figure 5C:
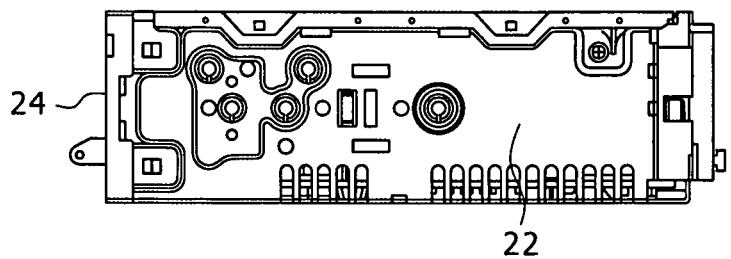
FIG. 5C is a view taken along arrow C of FIG. 5B.

FIG. 5A is a plan view of the apparatus body 12, FIG. 5B is a front view of the apparatus body 12, and FIG. 5C is a view taken along arrow C of FIG. 5B.

FIG. 6 illustrates the mounting of the microphone 20 onto the front panel 22.

Figure 9:
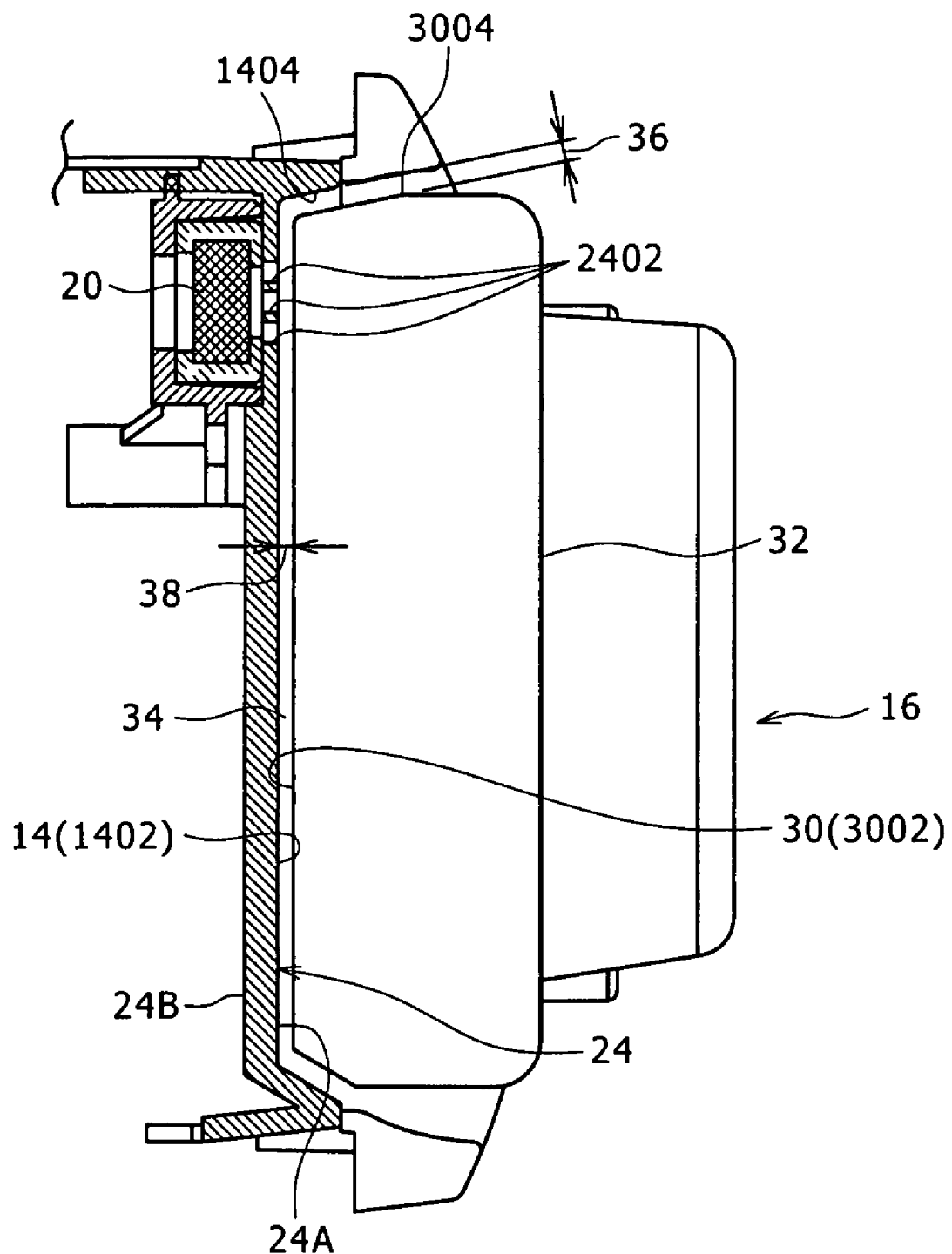
FIG. 9 is a sectional view taken along line B-B of FIG. 7.
Figure 10:
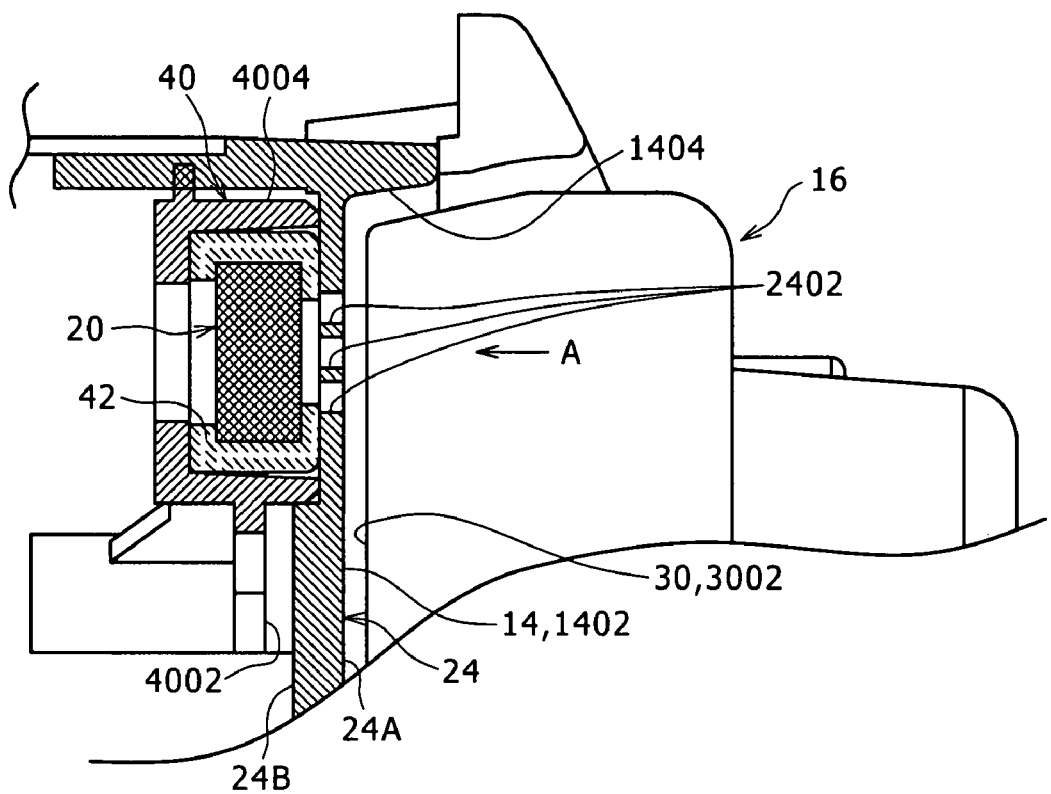
FIG. 10 is an enlarged view of a main part of FIG. 9.
Figure 11:
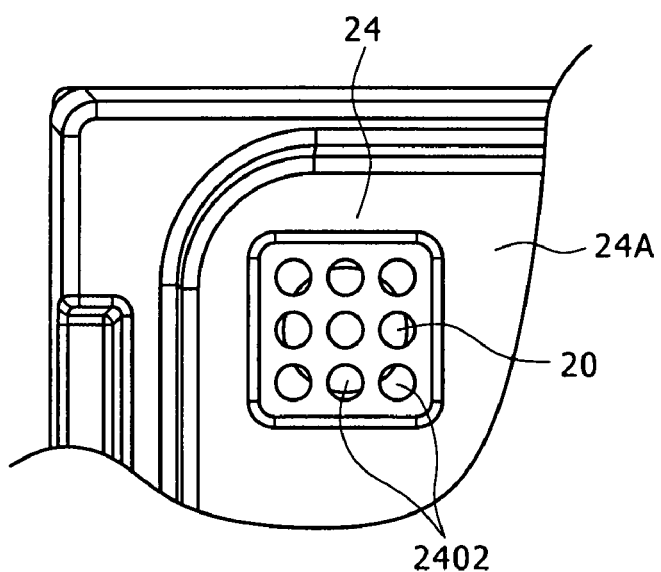
FIG. 11 is a view taken along arrow A of FIG. 10, showing the condition where a lid 16 is removed from FIG. 9.

FIG. 7 is a front view of the in-vehicle apparatus 10, FIG. 8A is a sectional view taken along line A-A of FIG. 7, FIG. 8B is an enlarged view of a major part of FIG. 8A, FIG. 9 is a sectional view taken along line B-B of FIG. 7, FIG. 10 is an enlarged view of a major part of FIG. 9, and FIG. 11 is a view taken along arrow A of FIG. 10, showing the condition where the lid 16 is removed from FIG. 9.

Figure 12:
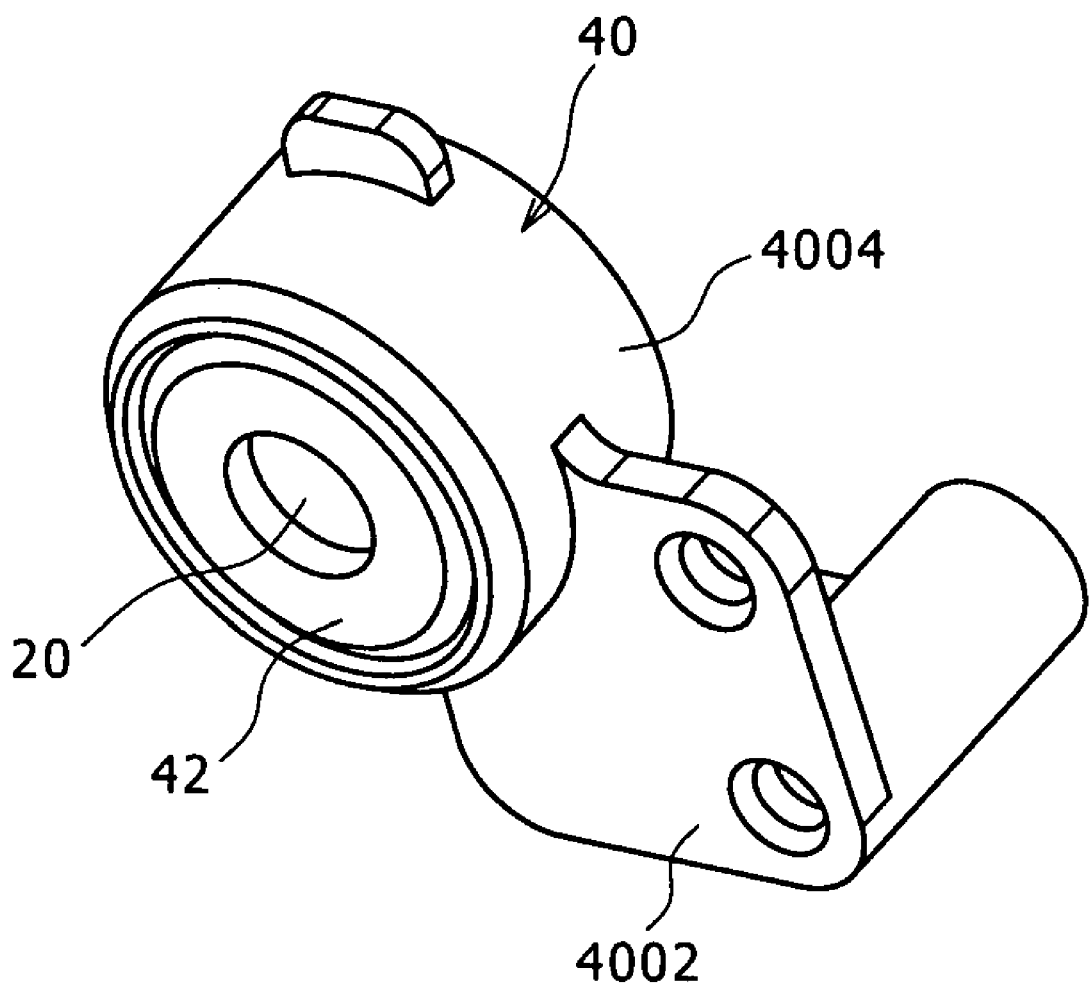
FIG. 12 is a perspective view of a holder onto which the microphone and a cover are mounted.
Figure 14:
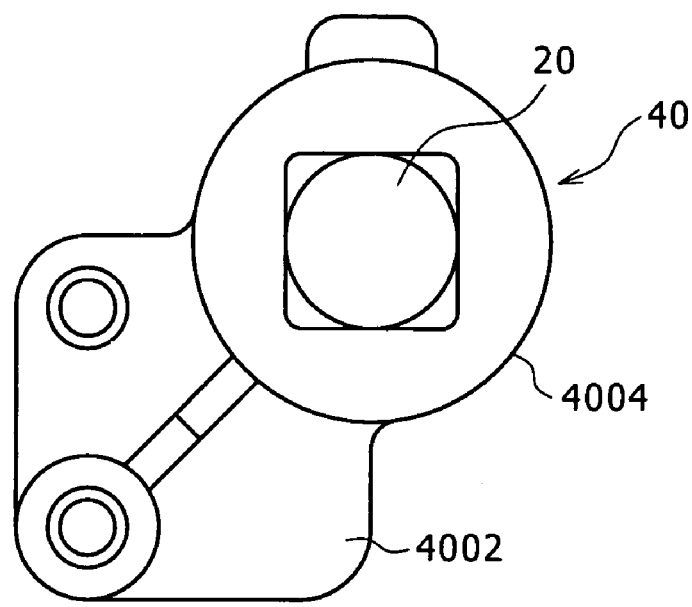
FIG. 14 is a view taken along arrow E of FIG. 13C.
Figure 15:
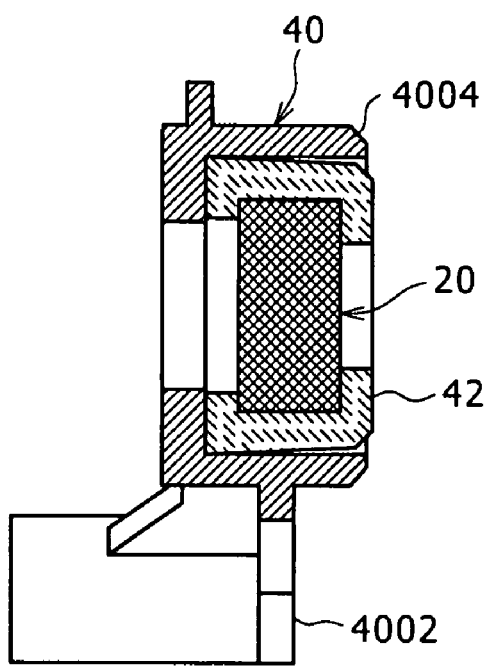
FIG. 15 is a sectional view taken along line A-A of FIG. 13A.

FIG. 12 is a perspective view of a holder 40 onto which the microphone 20 and a cover 42 are mounted, FIG. 13A is a plan view of the holder 40, FIG. 13B is a view taken along arrow B of FIG. 13A, FIG. 13C is a view taken along arrow C of FIG. 13A, FIG. 13D is a view taken along arrow D of FIG. 13A, FIG. 14 is a view taken along arrow E of FIG. 13C, and FIG. 15 is a sectional view taken along line A-A of FIG. 13A.

As shown in FIG. 6, the microphone 20 is provided in a location of the front surface 14 of the apparatus 12 so as to front on the front side of the front surface 14 in the condition where the lid 16 is opened. Incidentally, symbol 2002 in FIG. 6 denotes a wiring member for connection between the microphone 20 and the audio input unit 1008.

As shown in FIGS. 8 and 9, a gap 34 for communication between a location, where the microphone 20 is provided, of the front surface 14 and the inside of the vehicle compartment 2 (the outside of the in-vehicle apparatus 10) is secured between the front surface 14 of the apparatus body 12 and the lid 16 in the condition where the front surface 14 is closed with the lid 16.

The gap 34 extends between the front surface 14 of the apparatus body 12 and the lid 16 from a location, near the location where the microphone 20 is provided, of the outer periphery of the lid 16 to a location, fronting on the location where the microphone 20 is provided, of the back surface 30 of the lid 16, in the condition where the front surface 14 of the apparatus body 12 is closed with the lid 16.

In detail, the gap 34 extends between the front surface part 1402 of the apparatus body 12 and the back surface part 3002 of the lid 16, from a position between a location, near the location where the microphone 20 is provided, of the side surface part 1404 of the apparatus body 12 and a location, fronting on the location of the side surface part 1404, of the side surface part 3004 of the lid 16 to the location where the microphone 20 is provided, in the condition where the front surface 14 of the apparatus body 12 is closed with the lid 16.

Besides, in this embodiment, in the condition where the front surface 14 of the apparatus body 12 is closed with the lid 16, the gap 34 extends as follows. The gap 34 extends with a substantially uniform value between the location, near the location where the microphone 20 is provided, of the side surface part 1404 of the apparatus body 12 and the location, fronting on the location of the side surface part 1404, of the side surface part 3004 of the lid 16, and extends with a substantially uniform value between the front surface part 1402 of the apparatus body 12 and the back surface part 3002 of the lid 16, to reach the microphone 20.

Furthermore, in this embodiment, in the condition where the front surface 14 of the apparatus body 12 is closed with the lid 16, a first gap 36 with a substantially uniform value is formed between the side surface part 1404 of the apparatus body 12 and the side surface part 3004 of the lid 16, and a second gap 38 with a substantially uniform value is formed between the front surface part 1402 of the apparatus body 12 and the back surface part 3002 of the lid 16.

Therefore, in the condition where the front surface 14 of the apparatus body 12 is closed with the lid 16, the gap 34 for communication between the location where the microphone 20 is provided and the inside of the vehicle compartment 2 (the outside of the in-vehicle apparatus 10) includes the first gap 36 and the second gap 38.

As shown in FIG. 5B, the front surface 14 of the apparatus body 12 is rectangular in shape.

In this embodiment, the microphone 20 is provided at a location near an upper corner part of the rectangular shape of the front surface 14.

As shown in FIGS. 10 and 11, the microphone 20 is disposed in the inside of the casing 22 so as to front on the inside surface 24B of the front panel 24, and a multiplicity of holes 2404 penetrating from the inside surface 24B to the outside surface 24A of the front panel 24 are provided in the location, fronting on the microphone 20, of the front panel 24.

As shown in FIGS. 10, 12 and 15, the microphone 20 is held by the holder 40 formed of a synthetic resin.

As shown in FIGS. 12, 13A, 13B and 14, the holder 40 has an attaching flange 4002 for attachment to the casing 22, and a tubular part 4004.

The microphone 20 assumes a flat cylindrical shape, the outer peripheral part thereof is held by a cover 42 formed of a vibration-damping material, and the microphone 20 is mounted in the tubular part 4004 in the state of being covered with the cover 42.

A sound pickup part of the microphone 20 is disposed toward the multiplicity of holes 2402.

Now, the method of using the in-vehicle apparatus 10 will be described below.

First, in the case of performing reproduction of a disk-formed recording medium D by use of the audio system of the in-vehicle apparatus 10, the lid 16 closing the front surface 14 of the apparatus body 10 is opened to open the loading/unloading gate 26, the disk-formed recording medium D is inserted, and the front surface 14 is closed with the lid 16. Then, the operating members 17 related to the reproduction are appropriately operated, to thereby perform the reproduction. Replacement of the disk-formed recording medium D is conducted by opening the lid 16.

In addition, in the case of listening to radio broadcasting by use of the audio system of the in-vehicle apparatus 10, the operating members 17 related to the operation of the tuner unit 1004 are appropriately operated, for listening to the radio broadcasting.

First Embodiment

Next, the case of conducting hands-free conversation by use of the hands-free system of the in-vehicle apparatus 10 will be described.

Incidentally, the description will be made on the assumption that the in-vehicle apparatus 10 is in a use condition with the front surface 14 of the apparatus body 12 closed with the lid 16.

As shown in FIG. 4, when the user's cellular phone 90 supplied with power source is brought into the vehicle compartment, a Bluetooth radio line is established between the radiocommunication unit 9002 of the cellular phone 90 and the radiocommunication unit 1020 of the in-vehicle apparatus 10.

When a telephone call is made from the telephone set 94 on the other end side of line to the user's cellular phone 90 in the condition where the radio line is established through the radiocommunication unit 9002 of the cellular phone 90 and the radiocommunication unit 1020, a call reception sound is issued from the cellular phone 90.

When a reception switch 1708 among the operating members 17 is operated by the user in response to the call reception sound, the control unit 1014 controls the cellular phone 90 to establish a radio line between the cellular phone 90 and the telephone set 94 on the other end side of line, resulting in a condition where talking (conversation) can be made.

Specifically, an audio (voice) signal transmitted from the telephone set 94 on the other end side of line is supplied through the radiocommunication units 9002, 1020 and the control unit 1014 to the audio output unit 1006, and the voice from the other end side of line is outputted from the speaker 18, to be heard by the user.

In addition, notwithstanding the front surface 14 of the apparatus body 12 is closed with the lid 16, the voice of the user arrives at the microphone 20 to be picked up, since the gap 34 extends between the front surface 14 of the apparatus body 12 and the lid 16 from the location, near the location where the microphone 20 is provided, of the outer periphery of the lid 16 to the location, fronting on the location where the microphone 20 is provided, of the back surface 30 of the lid 16.

The audio signal outputted from the microphone 20 is transmitted through the audio input unit 1008, the control unit 1014 and the radiocommunication units 1020, 9002 to the telephone set 94 on the other end side of line.

Then, after the talking (conversation) is finished, a talk end switch 1709 is operated, whereby the radio line between the cellular phone 90 and the telephone set 94 is broken.

In this manner, the hands-free conversation (conversation) is carried out.

Besides, in the case where a telephone call is made from the cellular phone 90 to the telephone set 94 on the other end side of line, also, the hands-free conversation (conversation) is performed in the same manner as above.

As has been described above, according to the in-vehicle apparatus 10 in this embodiment, the gap 34 for communication between the location where the microphone 20 is provided of the front surface 14 of the apparatus body 12 and the inside of the vehicle compartment 2 is secured between the front surface 14 and the lid 16 in the condition where the front surface 14 is closed with the lid 16. Therefore, notwithstanding the front surface 14 of the apparatus body 12 is closed with the lid 16, the user's voice can be propagated through the gap between the front surface 14 of the apparatus body 12 and the back surface 30 of the lid 16, to arrive at and be picked up by the microphone 20.

Accordingly, unlike in the case where the microphone is installed in a location in the vehicle compartment remote from the in-vehicle apparatus, the need for a wiring member for connection between the microphone and the in-vehicle apparatus is eliminated. Therefore, the installation space for such a wiring member can be reduced, and the installation of the in-vehicle apparatus can be simplified. Moreover, it is unnecessary for the outside surface 30 of the lid 16 where the in-vehicle apparatus 10 fronts on the inside of the vehicle compartment to be provided with holes or an opening for guiding sounds to the microphone 20, which is advantageous for enhancing the appearance quality and enhancing the degree of freedom in design.

In addition, it has been found by practical measurements that the frequency characteristics of the audio signal picked up by the microphone 20 are better as the first and second gaps 36 and 38 are nearer to respective uniform values and that the frequency characteristics of the audio signal picked up by the microphone 20 tend to be worsened in the case where the values of the first and second gaps 36 and 38 are varied.

Therefore, in this embodiment, the gap 34 includes the first gap 36 having a uniform value and the second gap 38 having a uniform value, which is advantageous for obtaining an audio signal with good tone quality.

Besides, in this embodiment, the location where the microphone 20 is provided is a location near a corner part of the rectangular shape of the front surface 14 of the apparatus body 12, and this part is higher in rigidity than the parts, exclusive of the corner parts of the rectangular shape, of the front surface 14. Therefore, the microphone 20 is not liable to be influenced by vibration noises of the front surface 14 generated due to vibrations of the vehicle body, and pickup of unnecessary vibration sounds by the microphone 20 can be restrained, which is advantageous for picking up voices with good tone quality.

Besides, in the case where the microphone 20 is provided at the lid 16, it would be necessary for the audio signal outputted from the microphone 20 to be transmitted to the audio input unit 1008 through the lid-side connector 33 and the apparatus body side connector 28, leading to the need for increasing the number of contact pieces of the lid-side connector 33 and the apparatus body side connector 28.

In this embodiment, on the other hand, the microphone 20 is provided in the apparatus body 12, so that the number of contact pieces of the lid-side connector 33 and the apparatus body side connector 28 can be reduced, which is advantageous for achieving reductions in the installation spaces and the parts costs of the lid-side connector 33 and the apparatus body side connector 28.

In addition, the audio signal outputted from the microphone 20 is very weak. In the case where the microphone 20 is provided at the lid 16, it would be necessary that an amplification circuit for amplifying the audio signal outputted from the microphone 20 and a printed wiring board for constituting the amplification circuit are provided on the lid 16 side, and that the audio signal thus amplified is transmitted through a wiring member to the audio input unit 1008 provided in the apparatus body 12.

On the other hand, in this embodiment, the microphone 20 is provided in the apparatus body 12, so that there is no need to provide the lid 16 with an amplification circuit and a printed wiring board, which is more advantageous for reducing the installation spaces and the parts consist of the amplification circuit and the printed wiring board.

Besides, since the microphone 20 and the audio input unit 1008 are both provided in the apparatus body 12, the wiring member for connection between the microphone 20 and the audio input unit 1008 can be shortened, which is advantageous for suppressing the influence of external noises on the audio signal and securing the tone quality of the audio signal.

In addition, where the lid 16 is provided with the printed wiring board, electromagnetic waves are shielded by the printed wiring board, so that it would be necessary to dispose the antenna 1021 of the radiocommunication unit 1020 at a location remote from the printed wiring board. In this embodiment, on the other hand, the lid 16 is not provided with such a printed wiring board serving as a shield against electromagnetic waves, which is advantageous for securing the degree of freedom in laying out the antenna 1021.

In this embodiment, the antenna 1021 is disposed inside the apparatus body 12 at a position near the microphone 20; specifically, the antenna 1021 is disposed on the inside of the front panel 24 at a location in the vicinity of the inside surface 24B of the front panel 24.

Now, measurement results of the frequency characteristics of the sound picked up by the microphone 20 will be described.

Figure 16A:
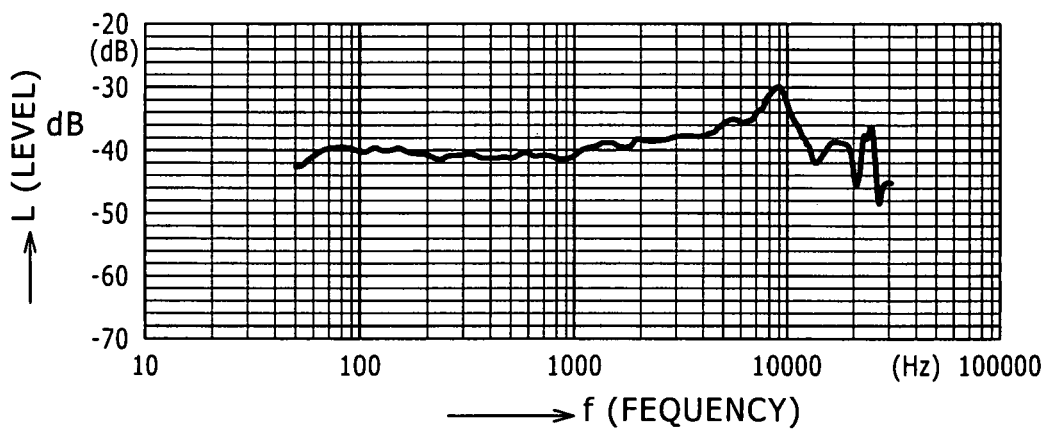
FIG. 16A is a diagram showing a frequency characteristic when the lid is opened.
Figure 16B:
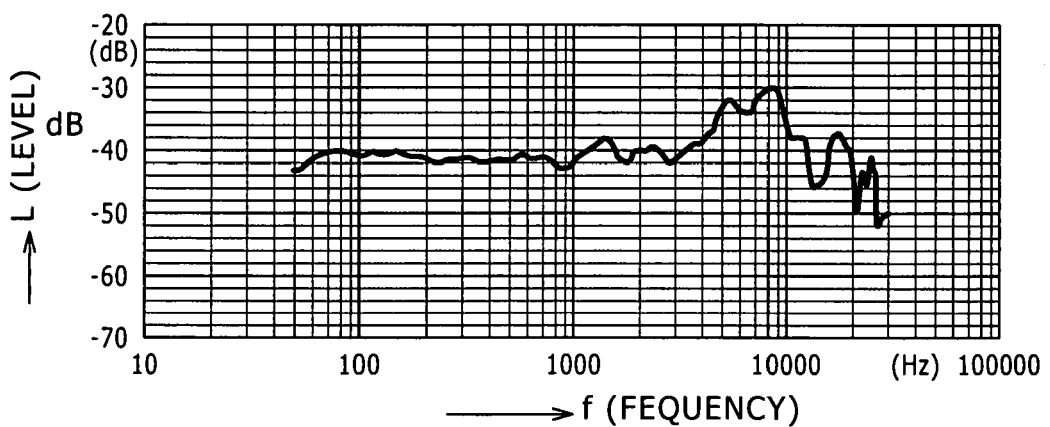
FIG. 16B is a diagram showing the frequency characteristic when the lid is closed.
Figure 16C:
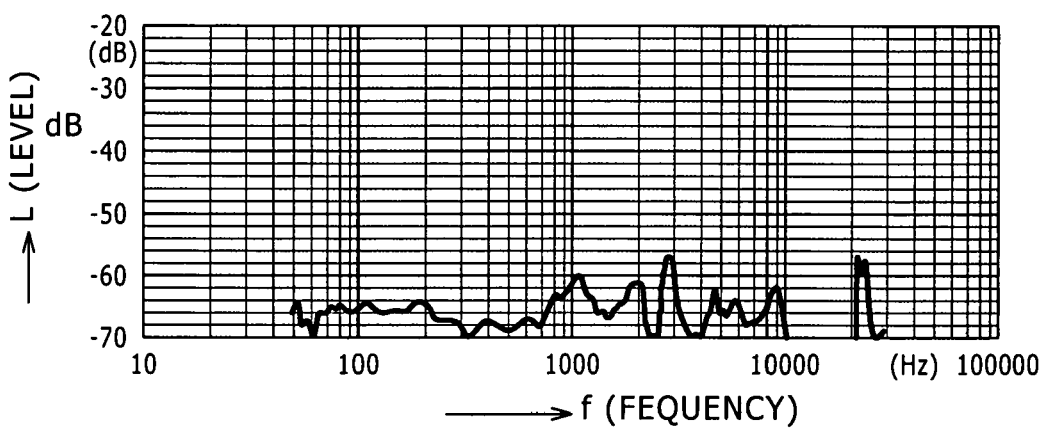
FIG. 16C is a diagram showing the frequency characteristic in the condition where a multiplicity of holes formed on the front sided of the microphone are shut tight.

FIG. 16A is a diagram showing the frequency characteristic in the condition where the lid 16 is opened, FIG. 16B is a diagram showing the frequency characteristic in the condition where the lid 16 is closed, and FIG. 16C is a diagram showing the frequency characteristic in the condition where the multiplicity of holes 2402 formed on the front side of the microphone 20 are shut tight.

In FIGS. 16A to 16C, the axis of ordinates represents the level L (dB) of the audio signal outputted from the microphone 20, and the axis of abscissas represents the frequency f (Hz) of the voice.

As shown in FIGS. 16A and 16B, even in the condition where the lid 16 is opened to uncover the front surface 14, or where the lid 16 is closed to cover the front surface 14, substantially comparable frequency characteristics are obtained.

Therefore, it is possible to pick up the voice favorably and to obtain an audio signal with good tone quality, if only the gap 34 is formed, even in the condition where the lid 16 is closed.

In addition, as shown in FIG. 16B, the level of the audio signal picked up by the microphone 20 after being guided through the gap 34 and the multiplicity of holes 2402 in the condition where the lid 16 is closed is not less than about −46 dB in a frequency range of 50 Hz to 2 kHz. On the other hand, as shown in FIG. 16C, the level of the audio signal of sound picked up by the microphone 20 after being transmitted through other portions of the casing 22 than the multiplicity of holes 2402 in the condition where the multiplicity of holes 2402 are closed is as extremely low as not more than −56 dB in a frequency range of 50 Hz to 2 kHz.

Therefore, there is no possibility that the sound (noise) arriving at the microphone 20 through other portions of the casing 22 than the multiplicity of holes 2402 might mix into, and might exert a bad influence on, the voice picked up by the microphone 20 by being guided through the gap 34 and the multiplicity of holes 2402.

Second Embodiment

Now, a second embodiment of the present invention will be described below.

In the first embodiment above, the case where the cellular phone 90 and the in-vehicle apparatus 10 are connected to each other by a Bluetooth or other radio line at the time of performing hands-free conversation has been described. In the second embodiment, on the other hand, the cellular phone 90 and the in-vehicle apparatus 10 are connected to each other by wiring.

FIG. 27 is a block diagram showing the configuration of a control system in the in-vehicle apparatus 10 according to the second embodiment, in which the same or equivalent parts to those in the first embodiment above are denoted by the same symbols as used above.

As shown in FIG. 27, in the second embodiment, the hands-free conversation system includes a speaker 18, a microphone 20, an audio output unit 1006, an audio input unit 1008, an interface unit 1030, and a control unit 1014.

The interface unit 1030 is provided in an apparatus body 12, and is for performing communication (conversation) by wire communication with an interface unit 9010 provided in the user's cellular phone 90.

Incidentally, a connector 1032 connected to the interface unit 1030 is provided in the outside of the apparatus body 12, the cellular phone 90 is provided with a connector 9012 connected to the interface unit 9010, and the connectors 1032 and 9012 are connected to each other, to thereby enable the wire communication between the interface unit 1030 and the interface unit 9010. As the wire communication, an existing communication provided in the cellular phone 90 is used.

When a communication line is established between the cellular phone 90 and a telephone set 94 on the other end side of line through a public network 92 under the condition where the wire circuit is established through the interface unit 9010 in the cellular phone 90 and the interface unit 1030, the hands-free conversation with the telephone set 94 on the other end side of line can be performed through the hands-free conversation system.

Specifically, the control unit 1014 performs such a control that the audio signal transmitted from the telephone set 94 on the other end side through the public network 92 and the interface units 9010, 1030 is received, to be converted into voice by the audio output unit 1006 and the speaker 18, whereas the audio signal of the user's voice is transmitted through the microphone 20, the audio input unit 1008, the interface units 1030, 9010 and the public network 92 to the telephone set 94 on the other end side of line.

Therefore, also in the second embodiment, the speaker 18 constitutes a part of the receiver unit for listening to the voice in the hands-free system, and the microphone 20 constitutes a part of the transmitter unit for picking up the voice in the hands-free system.

In the second embodiment as above, also, the same effects as those in the first embodiments can be displayed.

Incidentally, while the case where the car audio system has the reproduction unit 1002 capable of reproduction of the disk-formed recording medium D and the tuner unit 1004 has been described in the above embodiments, the audio system is not limited to the embodiments. The car audio system includes, for example, a semiconductor memory player for recording and/or reproduction of audio data or the like on a recording medium such as a memory card capable of being loaded in and unloaded from the apparatus body 12 or on a recording medium such as a semiconductor memory non-detachably incorporated in the apparatus body. The car audio system also includes an HDD player for recording and/or reproduction of audio data or the like on a hard disk drive, and a cassette tape player for recording and/or reproduction of audio data or the like on an audio cassette.

In addition, the data recorded on a recording medium such as the disk-formed recording medium, the memory card, the semiconductor memory, etc. is not limited to audio data, and may be video data, for example. In the case of video data, it suffices to provide the in-vehicle apparatus 10 with a display for displaying the reproduced video data. For example, in the case where the in-vehicle apparatus 10 constitutes a navigation system, a recording medium with map data recorded thereon is inserted through a loading/unloading gate into the apparatus body, and the map data read from the recording medium is displayed on the display.

Besides, while the case where the microphone 20 constitutes a part of the transmitter unit in the hands-free system has been described in the above embodiments, the use of the microphone 20 is not limited to this use.

For example, the apparatus body 12 may be provided with a sound measuring unit for measuring or analyzing acoustic characteristics of the environment in which the apparatus body 12 is installed, based on the sound picked up by the microphone 20. In this case, a predetermined voice may be reproduced by the car audio system and, simultaneously, the voice in the vehicle compartment may be picked up by the microphone 20, then the acoustic characteristic thereof may be measured and/or analyzed by the sound measuring unit, and sound field calibration, for example, control of the volume and tone quality of the sound from each speaker, or the like may be automatically conducted based on the results of the measurement or analysis.

In this case, naturally, the microphone 20 may function also as a part of the transmitter unit in the hands-free system, in the same manner as in the first and second embodiments.

It should be understood by those skilled in the art that various modifications, combinations, sub-combinations and alterations may occur depending on design requirements and other factors insofar as they are within the scope of the appended claims or the equivalents thereof.

What is claimed is:

1. An in-vehicle apparatus comprising:
an apparatus body;
a front surface of said apparatus body; and
a lid configured to open and close said front surface;
wherein a microphone directed to the front side of said front surface in the condition where said lid is opened is provided at said front surface of said apparatus body, and
a gap for communication between the location, where said microphone is provided, of said front surface and the outside is secured between said front surface and said lid in the condition where said front surface of said apparatus body is closed with said lid.

2. The in-vehicle apparatus as set forth in claim 1,
wherein said lid has a back surface fronting on said front surface of said apparatus body in the condition where said front surface is closed; and
said gap extends between said front surface of said apparatus body and said lid from a location, near said location where said microphone is provided, of the outer periphery of said lid to a location of said back surface of said lid which fronts on said location where said microphone is provided, in the condition where said front surface of said apparatus body is closed with said lid.

3. The in-vehicle apparatus as set forth in claim 1,
wherein said front surface of said apparatus body includes a horizontally elongate front surface part and a side surface part rising from the periphery of said front surface part;
said lid has a back surface part fronting on said front surface part, and a side surface part rising from the periphery of said back surface part and fronting on said side surface part of said front surface, in the state of closing said front surface of said apparatus body; and
said gap extends between said front surface part of said apparatus body and said back surface part of said lid from a position between a location, near said location where said microphone is provided, of said side surface part of said apparatus body and a location, fronting on said location of said side surface part of said apparatus body, of said side surface part of said lid, to said location where said microphone is provided, in the condition where said front surface of said apparatus body is closed with said lid.

4. The in-vehicle apparatus as set forth in claim 1,
wherein said front surface of said apparatus body includes a horizontally elongate front surface part and a side surface part rising from the periphery of said front surface part;
said lid has a back surface part fronting on said front surface part, and a side surface part rising from the periphery of said back surface part and fronting on said side surface part of said front surface, in the condition where said front surface is closed; and
said gap extends with a substantially uniform value between a location, near said location where said microphone is provided, of said side surface part of said apparatus body and a location, fronting on said location of said side surface, of said side surface part of said lid, and extends with a substantially uniform valve between said front surface part of said apparatus body and said back surface part of said lid, to reach said location where said microphone is provided.

5. The in-vehicle apparatus as set forth in claim 1,
wherein said front surface of said apparatus body includes a horizontally elongate front surface part and a side surface part rising from the periphery of said front surface part;
said lid has a back surface part fronting on said front surface part, and a side surface part rising from the periphery of said back surface part and fronting on said side surface part of said front surface, in the condition where said front surface is closed;

a first gap with a substantially uniform value is formed between said side surface part of said apparatus body and said side surface part of said lid, and a second gap with a substantially uniform value is formed between said front surface part of said apparatus body and said back surface part of said lid, in the condition where said front surface of said apparatus body is closed with said lid; and said gap for communication between said location where said microphone is provided and said outside is composed to include said first gap and said second gap, in the condition where said front surface of said apparatus body is closed with said lid.

6. The in-vehicle apparatus as set forth in claim 1,
wherein said front surface of said apparatus body is substantially rectangular in shape; and
said microphone is provided at a location near a corner part of said rectangular shape of said front surface.

7. The in-vehicle apparatus as set forth in claim 1,
wherein said apparatus body has a casing, said front part of said apparatus body is an outside surface of a front panel constituting a front surface of said casing, said front panel has an inside surface fronting on the inside of said casing, said microphone is disposed in the inside of said casing so as to front on said inside surface of said front panel, and a plurality of holes penetrating from the inside surface to the outside surface of said front panel are provided in said front panel at a location fronting on said microphone.

8. The in-vehicle apparatus as set forth in claim 7,
wherein said microphone is held by a cover formed by use of a vibration-damping material, and is mounted in position through said cover.

9. The in-vehicle apparatus as set forth in claim 1,
wherein an operating member for operating said apparatus body is disposed at said front surface of said lid where said lid fronts on the outside in the condition where said front surface of said apparatus body is closed with said lid.

10. The in-vehicle apparatus as set forth in claim 1,
wherein said lid is provided to be swingable relative to said front surface of said apparatus body;
said lid has a back surface fronting on said front surface of said apparatus body and a front surface fronting on the outside, in the state of closing said front surface of said apparatus body;
an operating member for operating said apparatus body is disposed at said front surface of said lid;
a connector for connection to said operating member is provided at said back surface of said lid; and
a connector which is engaged with said connector at said back surface of said lid in the condition where said front surface of said apparatus body is closed with said lid and which is disengaged from said connector at said back surface of said lid in the condition where said front surface of said apparatus body is opened is provided at said front surface of said apparatus body.

11. The in-vehicle apparatus as set forth in claim 1,
wherein said lid is provided to be swingable relative to said front surface of said apparatus body;
said lid has a back surface fronting on said front surface of said apparatus body and a front surface fronting on the outside, in the state of closing said front surface of said apparatus body;
an operating member for operating said apparatus body is disposed at said front surface of said lid; and
a flexible substrate for transfer of signals between said operating member and said apparatus body is provided between said lid and said apparatus body.

12. The in-vehicle apparatus as set forth in claim 1,
wherein said lid is provided to be detachable from said front surface of said apparatus body;
said lid has a back surface fronting on said front surface of said apparatus body and a front surface fronting on the outside, in the state of closing said front surface of said apparatus body;
an operating member for operating said apparatus body is disposed at said front surface of said lid;
a connector for connection to said operating member is provided at said back surface of said lid; and
a connector which is engaged with said connector at said back surface of said lid in the condition where said front surface of said apparatus body is closed and which is disengaged from said connector at said back surface of said lid in the condition where said lid is detached from said front surface of said apparatus body is provided at said front surface of said apparatus body.

13. The in-vehicle apparatus as set forth in claim 1,
wherein said apparatus body has a lid frame for detachably supporting said lid and for moving said lid in the directions for opening and closing said front surface of said apparatus body;
said lid has a back surface fronting on said front surface of said apparatus body and a front surface fronting on the outside, in the state of closing said front surface of said apparatus body;
an operating member for operating said apparatus body is disposed at said front surface of said lid;
a flexible substrate for transfer of signals between said operating member at said lid supported by said frame and said apparatus body is provided between said frame and said apparatus body; and
a connector for transfer of signals between said operating member and said apparatus body through said flexible substrate is detachably attached to said lid and said frame.

14. The in-vehicle apparatus as set forth in claim 1, wherein said apparatus body is provided with a reproduction unit for reproduction of data recorded on a recording medium, and said front surface of said apparatus body is provided with a loading/unloading gate for loading and unloading said recording medium.

15. The in-vehicle apparatus as set forth in claim 1,
wherein said apparatus body is provided with a reproduction unit for reproducing audio data recorded on a disk-formed recording medium and outputting an audio signal, and an audio output unit for applying a predetermined signal processing to said audio signal outputted from said reproduction unit and supplying a processed signal to a speaker;
said front surface of said apparatus body is provided with a loading/unloading gate for loading and unloading said disk-formed recording medium; and
said reproduction unit and said audio output unit constitute a part of a car audio system.

16. The in-vehicle apparatus as set forth in claim 1,
wherein said apparatus body is provided with a reproduction unit for reproducing audio data recorded on a disk-formed recording medium and outputting an audio signal, and an audio output unit for applying a predetermined signal processing to said audio signal outputted from said reproduction unit and supplying a processed signal to a speaker;

said front surface of said apparatus body is provided with a loading/unloading gate for loading and unloading said disk-formed recording medium;

said reproduction unit and said audio output unit constitute a part of a car audio system; and an operating member for operating said car audio system is provided at a front surface of said lid where said lid fronts on the outside in the condition where said front surface of said apparatus body is closed with said lid.

17. The in-vehicle apparatus as set forth in claim 1, wherein said apparatus body is provided with a hands-free system so configured that hands-free conversation can be performed by use of a cellular phone, and said microphone has at least the function of picking up sound in said hands-free system.

18. The in-vehicle apparatus as set forth in claim 1, wherein said apparatus body is provided with a sound measuring unit for measuring or analyzing acoustic characteristics in the environment in which said apparatus body is disposed, based on a sound picked up, said measured or analyzed acoustic characteristics are used for calibrating the sound field in said environment, and said microphone has at least the function of picking up said sound.

19. The in-vehicle apparatus as set forth in claim 1, wherein said apparatus body is disposed in a vehicle compartment, and said front surface of said apparatus body fronts on said vehicle compartment in the condition where said lid is opened.

\* \* \* \* \*